(12) United States Patent
Daigle et al.

(10) Patent No.: US 11,643,497 B2
(45) Date of Patent: May 9, 2023

(54) POLYMERS COMPRISING IMIDAZOLE DERIVATIVES AND THEIR USE IN ELECTROCHEMICAL CELLS

(71) Applicants: HYDRO-QUÉBEC, Montréal (CA); MURATA MANUFACTURING CO., LTD., Nagaokakyo (JP)

(72) Inventors: Jean-Christophe Daigle, St-Bruno-de-Montarville (CA); Charlotte Mallet, Montreal (CA); Yuichiro Asakawa, Tokyo (JP); Melanie Beaupre, Lac-Aux-Sables (CA); Shinichi Uesaka, Nagaokakyo (JP); Karim Zaghib, Longueuil (CA)

(73) Assignees: HYDRO-QUEBEC, Montreal (CA); MURATA MANUFACTURING CO., LTD., Nagaokakyo (JP)

( * ) Notice: Subject to any disclaimer, the term of this patent is extended or adjusted under 35 U.S.C. 154(b) by 516 days.

(21) Appl. No.: 16/627,594

(22) PCT Filed: Jul. 6, 2018

(86) PCT No.: PCT/CA2018/050830
§ 371 (c)(1),
(2) Date: Dec. 30, 2019

(87) PCT Pub. No.: WO2019/006560
PCT Pub. Date: Jan. 10, 2019

(65) Prior Publication Data
US 2021/0147604 A1 May 20, 2021

Related U.S. Application Data

(60) Provisional application No. 62/529,146, filed on Jul. 6, 2017.

(51) Int. Cl.
| | | |
|---|---|---|
| *C08F 2/46* | (2006.01) |
| *C08F 2/50* | (2006.01) |
| *C08G 61/04* | (2006.01) |
| *C08F 299/02* | (2006.01) |
| *C08F 220/06* | (2006.01) |
| *C08F 226/06* | (2006.01) |
| *H01M 4/505* | (2010.01) |
| *H01M 4/62* | (2006.01) |
| *H01M 10/0525* | (2010.01) |
| *H01M 10/0565* | (2010.01) |
| *C08F 293/00* | (2006.01) |
| *C08F 230/04* | (2006.01) |
| *H01M 50/417* | (2021.01) |

(52) U.S. Cl.
CPC ........ *C08F 299/024* (2013.01); *C08F 220/06* (2013.01); *C08F 226/06* (2013.01); *C08F 230/04* (2013.01); *C08F 293/005* (2013.01); *H01M 4/505* (2013.01); *H01M 4/623* (2013.01); *H01M 10/0525* (2013.01); *H01M 10/0565* (2013.01); *H01M 50/417* (2021.01); *H01M 2300/0082* (2013.01); *H01M 2300/0085* (2013.01)

(58) Field of Classification Search
CPC ...... H01M 4/623; H01M 4/505; H01M 4/622; H01M 4/5825; H01M 4/485; H01M 10/052; H01M 10/565; H01M 10/525; H01M 50/417; H01M 2300/0082; H01M 2300/0085; C08F 22/06; C08F 220/06; C08F 226/06; C08F 293/005; C08F 2530/04; C08F 126/06; C08F 299/024; C08F 2348/03; Y02E 60/10
USPC ......................................... 522/167, 1; 520/1
See application file for complete search history.

(56) References Cited

U.S. PATENT DOCUMENTS

| | | | | |
|---|---|---|---|---|
| 3,449,123 A * | 6/1969 | Hideo | ............ | G03C 7/413 |
| | | | | 430/941 |
| 4,299,939 A * | 11/1981 | Panzer | ............ | C08F 26/06 |
| | | | | 526/258 |
| 6,624,270 B1 * | 9/2003 | Rasmussen | ............ | C08F 226/06 |
| | | | | 526/341 |
| 7,309,544 B2 | 12/2007 | Nobuta et al. | | |
| 2006/0204813 A1 | 9/2006 | Hirakimoto et al. | | |
| 2013/0224632 A1 | 8/2013 | Roumi | | |

FOREIGN PATENT DOCUMENTS

| | | | |
|---|---|---|---|
| CN | 102020748 A | | 4/2012 |
| CN | 106336480 A | | 1/2017 |
| JP | H11260407 A | | 9/1999 |
| JP | 2005 322555 A | | 11/2005 |
| JP | 2015505122 | * | 2/2015 |
| KR | 10-2004-0014247 A | | 2/2004 |

OTHER PUBLICATIONS

Lawson, 2-Vinylimidazole and 1-Methyl-2-ivnylimidazole, 1953, vol. 75, pp. 3398-3400 (Year: 1953).*
Johnson et al., The copolymerization of 1-alkylvinazene with styrene, 2001, J. Macromol. Sci.-Pure Appl. Chem., A38(8), 773-783 (Year: 2001).*
Densmore et al, New Acetylenic Monomers and Polymers from 4,5-Dicyanoimidazole, 2004, Macromolecules, 37, 5900-5910 (Year: 2004).*
Shin et al, Electron-accepting Conjugated materials based on 2-vinyl-4,5-dicyanoimidazole for application in organic electronics, 2009, J. Org. Chem, 74, 3293-3298 (Year: 2009).*
Gronwald et al, JP 2015-505122 Machine Translation, Feb. 16, 2015 (Year: 2015).*

(Continued)

*Primary Examiner* — Jessica Whiteley
(74) *Attorney, Agent, or Firm* — Buchanan Ingersoll & Rooney P.C.

(57) ABSTRACT

Here are described polymers comprising monomeric units from vinylimidazole derivatives and their use in electrode materials and/or electrolyte compositions, as well as their methods of preparation. Also described are electrode materials, electrodes, and electrochemical cells comprising the polymers and their use.

36 Claims, 9 Drawing Sheets

(56) References Cited

OTHER PUBLICATIONS

Yamamoto, H. et al. "Chapter 7 SBR Binder (for Negative Electrode) and ACM Binder (for Positive Electrode)" ZEON Corporation, Yako 1-2-1, Kawasaki, 210-9507, 2009, Japan h.mori@zeon.co.jp, pp. 163-179.

Guerfi, A. et al. "LiFePO4 water-soluble binder electrode for Li-ion batteries" Elsevier, Journal of Power Sources, vol. 163, (2007), pp. 1047-1052.

Lux, S. F. et al. "Low Cost, Environmentally Benign Binders for Lithium-Ion Batteries" ESC, Journal of The Electrochemical Society, vol. 157, No. 3, 2010, pp. 320-325.

Chou, S. L. et al. "Small things make a big difference: binder effects on the performance of Li and Na batteries" Phys. Chem. Chem. Phys, This journal is©the Owner Societies 2014, 15 pages.

Lee, J. T. et al. "A novel and efficient water-based composite binder for LiCoO2 cathodes in lithium-ion batteries" Elsevier, Journal of Power Sources, vol. 173, (2007), pp. 985-989.

Cai, Z. P. et al. "Preparation and performances of LiFePO4 cathode in aqueous solvent with polyacrylic acid as a " Elsevier, Journal of Power Sources, vol. 189, (2009), pp. 547-551.

Gong, L. et al. "High polar polyacrylonitrile as a potential binder for negative electrodes in lithium ion batteries" Elsevier, Electrochemistry Communications, vol. 29, (2013), pp. 45-47.

Park, H. K., et al. "Effect of high adhesive polyvinyl alcohol binder on the anodes of lithium ion batteries" Elsevier, Electrochemistry Communications, vol. 13, (2011), pp. 1051-1053.

Tran, B. et al. "Adhesive PEG-based binder for aqueous fabrication of thick Li4Ti5O12 electrode" Elsevier, Electrochimica Acta, vol. 88, (2013), pp. 536-542.

Chen, W. M. et al. Insight into the improvement of rate capability and cyclability in LiFePO4/polyaniline composite cathode, Elsevier, Electrochimica Acta, vol. 56, (2011), pp. 2689-2695.

Javier, A. E. et al. "Simultaneous Electronic and Ionic Conduction in a Block Copolymer: Application in Lithium Battery Electrodes" Angew. Chem. Int. Ed., 2011, vol. 50, pp. 9848-9851.

Densmore, C. G. et al. "New Acetylenic Monomers and Polymers from 4,5-Dicyanoimidazole" Macromolecules 2004, vol. 37, No. 16, pp. 5900-5910.

Shin, R. Y. C. et al. "Electron-Accepting Conjugated Materials Based on 2-Vinyl-4,5-dicyanoimidazoles for Application in Organic Electronics" JOCArticle, J. Org. Chem., 2009, vol. 74, pp. 3293-3298.

Office Action (Text of the Second Office Action) dated Apr. 8, 2022, by the Chinese Patent Office in corresponding Chinese Patent Application No. 201880044781.0, and an English Translation of the Office Action. (21 pages).

International Search Report and Written Opinion issued in corresponding International Patent Application No. PCT/CA2018/050830, 12 pages (dated Sep. 17, 2018).

Jung, K., et al., "Carbon nanofiber electrodes for supercapacitors derived from new precursor polymer: Poly(acrylonitrile-co-vinylimidazole)," http://dx.doi.org/10.1016/j.elecom.2012.07.026, Electrochemistry Communications, 23, pp. 149-152 (2012).

Lawson, J.K., Jr., "2-Vinylimidazole and 1-Methyl-2-vinylimidazole," https://doi.org/10.1021/ja01110a029, J.A.C.S. vol. 75, No. 14, 1, pp. 3398-3400 (Jul. 1, 1953).

Office Action (Notice of Reasons for Rejection) dated Jun. 29, 2022, by the Japanese Patent Office in corresponding Japanese Patent Application No. 2019-572388, and an English Translation of the Office Action (8 pages).

Extended European Search Report dated Jun. 11, 2021, issued by the European Patent Office in corresponding European Application No. 18828553.0-1107, (13 pages).

Johnson, D. M. et al."The Copolymerization of 1-Alkylvinazenes with Styrene" J. Macromol. Sci.—Pure Appl. Chem., A3(8), 773-783, (2001).

* cited by examiner

POLYMERS COMPRISING IMIDAZOLE DERIVATIVES AND THEIR USE IN ELECTROCHEMICAL CELLS

RELATED APPLICATION

This application claims priority to U.S. provisional application No. 62/529,146 filed on Jul. 6, 2017, the content of which is incorporated herein by reference in its entirety for all purposes.

TECHNICAL FIELD

The technical field generally relates to polymers comprising monomeric units derived from vinylimidazole derivatives, their methods of production and their use in electrochemical cells, for instance, in composite electrodes and/or in polymer electrolytes.

BACKGROUND

In the field of rechargeable batteries, polymer binders are commonly used to promote cohesion between active material particles and mechanical adhesion of the active material to the current collector. Traditional polymer binders comprised in a composite electrode are electrochemically inactive and chemically inert over the potential range used. However, they significantly contribute to the mass and stability of the battery (see Yamamoto, H et al., Lithium-Ion Batteries: Science and Technologies. Springer New York, 2009, 163-179).

A polymer most commonly used in commercial batteries is poly(vinyl difluoride) (PVDF) dissolved in an organic solvent such as N-methyl-2-pyrrolidone (NMP). NMP is known for being toxic and for having negative environmental impacts and a very high boiling temperature (202° C.) (Guerfi, A. et al., *Journal of Power Sources*, 163.2 (2007): 1047-1052; Lux, S. F. et al., *Journal of the Electrochemical Society*, 157.3 (2010): A320-A325). Although PVDF dissolved in NMP is an effective electrochemically inert polymeric binder, it holds significant drawbacks for its use in industrial applications, such as production costs and solvent evaporation post electrode coating, which requires a substantial amount of energy (Lux, S. F. et al., Supra). Furthermore, when in contact with the battery electrolyte, PVDF induces the formation of lithium fluoride which accelerates the binder's chemical degradation (see Guerfi, A. et al., Supra) thereby increasing the battery degradation rate and, consequently, reducing its useful life.

Carboxymethyl cellulose (CMC) used in combination with styrene-butadiene rubber (SBR) is another common example of polymeric coating used in the field of rechargeable batteries. In this aqueous based polymeric binder, SBR contributes to the coating's adhesion to the current collector while CMC helps thickening the dispersion and adhesion between active material particles (Guerfi, A. et al., Supra). CMC/SBR binders can be used in combination with active materials such as LiFePO$_4$ and LTO (Chou, S. L. et al., *Physical Chemistry Chemical Physics*, 16.38 (2014): 20347-20359) but are known to be ineffective with materials like LCO (Lee, J. T. et al., Journal of Power Sources 173.2 (2007): 985-989). Again, like PVDF/NMP, CMC/SBR binders are electrochemically inactive and do not contribute positively to the battery efficiency.

Poly (acrylonitrile) (PAN), poly (acrylic acid) (PAA) and poly (vinyl alcohol) (PVA) have also been used as polymeric binders for composite electrodes (Cai, Z. P. et al., *Journal of Power Sources*, 189.1 (2009): 547-551; Gong, L. et al., *Electrochemistry Communications*, 29 (2013): 45-47; Park, H. K. et al., *Electrochemistry Communications*, 13.10 (2011): 1051-1053). However, these polymers generally lack flexibility (high glass transition), which constitutes a major obstacle to their use. Indeed, upon extensive cycling of electrodes, these polymeric binders are known to form cracks such that the composite electrode's integrity is lost (Tran, B. et al., *Electrochimica Acta* 88 (2013): 536-542).

Generally, except for some publications using electronically conductive binders (see Chen, W. M. et al., *Electrochimica Acta*, 56.6 (2011): 2689-2695; and Javier, A. E. et al., *Angewandte Chemie International Edition*, 50.42 (2011): 9848-9851), the majority of polymers reported as binder are electrochemically inert.

Electronic polymers incorporating 2-vinyl-4,5-dicyanoimidazole monomers were reported for photovoltaic applications (Densmore, C. G. et al., *Macromolecules* 37.16 (2004): 5900-5910; Shin, R. Y. C. et al., *Journal of Organic Chemistry* 74.9 (2009): 3293-3298). However, these publications do not describe the use of imidazole derivative polymers as polymeric binders in applications such as rechargeable lithium batteries.

Accordingly, there is a need for alternative polymers excluding one or more of the drawbacks of the above polymers. For instance, polymeric binders having reduced production and/or use costs or incorporating a monomer promoting the diffusion of ions within composite electrodes and/or electrolytes in electrochemical cells.

SUMMARY

According to one aspect, the present technology relates to a polymer comprising monomeric units derived from Formulae I and II:

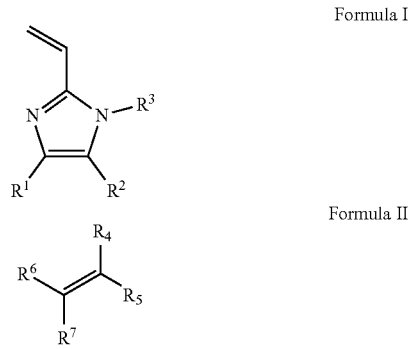

wherein, $R^1$ and $R^2$ are each independently selected from H, CN, F, and optionally fluorinated $C_{1-6}$alkyl;

$R^3$ is selected from a hydrogen atom and an optionally substituted $C_{1-6}$alkyl group;

$R^4$, $R^6$, and $R^7$ are each independently selected from a hydrogen atom and optionally substituted $C_{1-6}$alkyl; and $R^5$ is selected from —CO$_2$H, optionally substituted —CO$_2$C$_{1-6}$alkyl, —C(O)NH$_2$, optionally substituted —OC$_{1-6}$alkyl, optionally substituted C$_6$aryl, optionally substituted C$_{5-6}$heteroaryl, —CN, —SO$_3$H, —SO$_2$NH$_2$, and optionally substituted —SO$_3$C$_{1-6}$alkyl; or $R^5$ taken together with $R^7$ and their adjacent carbon atoms form a 5 or 6-membered heterocycle;

or a salt thereof.

In one embodiment, there is provided a polymer comprising monomeric units derived from Formula I:

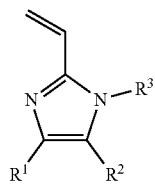

Formula I wherein,
$R^1$ and $R^2$ are each independently selected from H, CN, F, and optionally fluorinated $C_{1-6}$ alkyl; and
$R^3$ is selected from a hydrogen atom and an optionally substituted $C_1$-6 alkyl group;
or a salt thereof.

In another embodiment, there is provided a polymer for use in an element of an electrochemical cell, in the electrode material, in the electrolyte composition and/or in the separator. Wherein, said polymer is either a homopolymer comprising monomeric units derived from Formula I or a copolymer comprising monomeric units derived from Formulae I and II.

In another embodiment, there is provided an electrode material comprising a polymer and an electrochemically active material. Wherein, said polymer is either a homopolymer comprising monomeric units derived from Formula I or a copolymer comprising monomeric units derived from Formulae I and II.

In another embodiment, there is provided an electrolyte comprising either a homopolymer comprising monomeric units derived from Formula I or a copolymer comprising monomeric units derived from Formulae I and II.

In another embodiment, there is provided an electrolyte comprising a separator and an electrolyte composition, wherein said separator comprises either a homopolymer comprising monomeric units derived from Formula I or a copolymer comprising monomeric units derived from Formulae I and II.

In another embodiment, there is provided an electrochemical cell comprising a negative electrode, a positive electrode and an electrolyte, wherein at least one of the negative electrode, positive electrode and electrolyte comprises either a homopolymer comprising monomeric units derived from Formula I or a copolymer comprising monomeric units derived from Formulae I and II.

In another embodiment, there is provided an electrochemical cell comprising a negative electrode, a positive electrode and an electrolyte, wherein at least one of the negative electrode and positive electrode comprises an electrode material comprising either a homopolymer comprising monomeric units derived from Formula I or a copolymer comprising monomeric units derived from Formulae I and II and an electrochemically active material.

According to another aspect, the present technology relates to an electrochemical cell comprising a negative electrode, a positive electrode and an electrolyte, wherein the electrolyte comprises either a homopolymer comprising monomeric units derived from Formula I or a copolymer comprising monomeric units derived from Formulae I and II.

Other features and advantages of the present technology will be better understood upon reading of the description herein below and appended figures.

DETAILED DESCRIPTION

Figure 1:
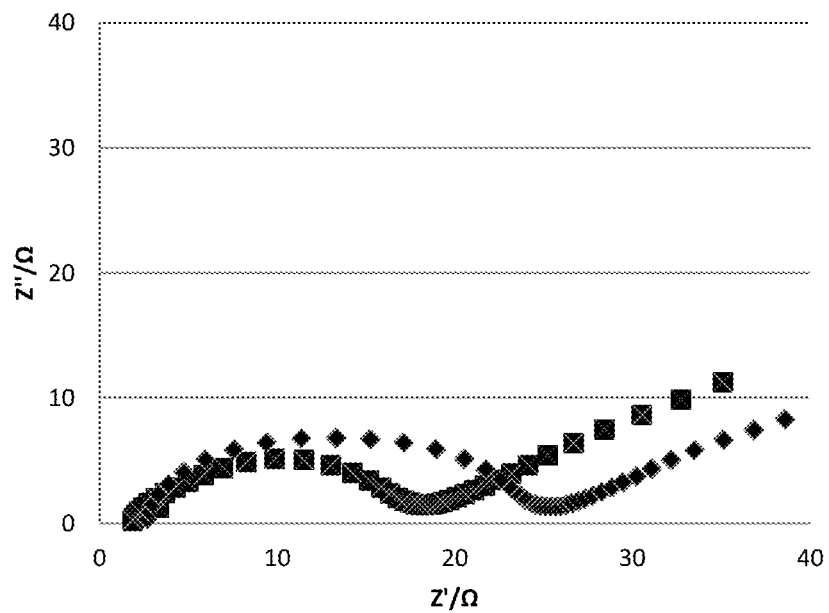
FIG. 1 displays an electrochemical impedance spectrum recorded with LFP/Li cells. The square line is recorded with a LFP/Li cell comprising the cathode material C3 (i.e. comprising P(AA-co-2-vinyl-4,5-dicyanoimidazole)) and the diamond line is recorded with a reference LFP/Li cell comprising the cathode material C1 using a PVdF binder.

The following detailed description and examples are illustrative and should not be interpreted as further limiting the scope of the invention.

All technical and scientific terms and expressions used herein have the same definitions as those commonly understood by the person skilled in the art relating to the present technology. The definition of some terms and expressions used is nevertheless provided below.

For more certainty, the expression "monomeric units derived from" and equivalent expressions used herein refer to a polymer repeat units which is the result of a polymerizable monomer after its polymerization. For example, referring to a monomeric unit derived from a vinyl group is equivalent to a reference to its ethylene polymerized form.

The chemical structures described herein, are drawn according to conventional standards. Also, when an atom, such as a carbon atom, as drawn seems to include an incomplete valency, then the valency is assumed to be satisfied by one or more hydrogen atoms even though these are not necessarily explicitly drawn.

As used herein, the term "alkyl" refers to saturated hydrocarbons having from one to sixteen carbon atoms, including linear or branched alkyl groups. Examples of alkyl groups include, without limitation, methyl, ethyl, propyl, butyl, pentyl, hexyl, heptyl, octyl, nonyl, decyl, isopropyl, tert-butyl, sec-butyl, isobutyl, and the like. When the alkyl group is located between two functional groups, then the term alkyl also encompasses alkylene groups such as methylene, ethylene, propylene, and the like. The term "$C_1$-$C_n$alkyl" refers to an alkyl group having from 1 to the indicated "n" number of carbon atoms.

The term "alkoxy" as used herein means an alkyl group having an oxygen atom attached thereto. Representative alkoxy groups include groups having 1 to about 6 carbon atoms, e.g., methoxy, ethoxy, propoxy, tert-butoxy and the like. Examples of alkoxy groups include methoxy, ethoxy, isopropyloxy, propoxy, butoxy, pentoxy, glycidyloxy, fluoromethoxy, difluoromethoxy, trifluoromethoxy, chloromethoxy, dichloromethoxy, trichloromethoxy groups and the like. The term alkoxy includes both unsubstituted or substituted alkoxy groups.

The term "cycloalkyl" and equivalent expressions refer to a group comprising a saturated or partially unsaturated (non-aromatic) carbocyclic ring in a monocyclic or polycyclic ring system, including spiro (sharing one atom) or fused (sharing at least one bond) carbocyclic ring systems, having from three to fifteen ring members. Examples of cycloalkyl groups include, without limitation, cyclopropyl, cyclobutyl, cyclopentyl, cyclopenten-1-yl, cyclopenten-2-yl, cyclopenten-3-yl, cyclohexyl, cyclohexen-1-yl, cyclohexen-2-yl, cyclohexen-3-yl, cycloheptyl, bicyclo[4,3,0]nonanyl, norbornyl, and the like. The term cycloalkyl includes both unsubstituted cycloalkyl groups and substituted cycloalkyl groups. The term "$C_3$-$C_n$cycloalkyl" refers to a cycloalkyl group having from 3 to the indicated "n" number of carbon atoms in the ring structure.

The terms "heterocycloalkyl" and equivalent expressions refer to a group comprising a saturated or partially unsaturated (non-aromatic) carbocyclic ring in a monocyclic or polycyclic ring system, including spiro (sharing one atom) or fused (sharing at least one bond) carbocyclic ring systems, having from three to fifteen ring members, where one or more (up to six) ring members are substituted or unsubstituted heteroatoms (e.g. N, O, S, P) or groups containing such heteroatoms (e.g. NH, $NR_x$ ($R_x$ is alkyl, acyl, aryl, heteroaryl or cycloalkyl), $PO_2$, SO, $SO_2$, and the like). Heterocycloalkyl groups may be C-attached or heteroatom-attached (e.g. via a nitrogen atom) where such is possible. Examples of heterocycloalkyl groups include, without limitation, pyrrolidino, tetrahydrofuranyl, tetrahydrodithienyl, tetrahydropyranyl, tetrahydrothiopyranyl, piperidino, morpholino, thiomorpholino, thioxanyl, piperazinyl, azetidinyl, oxetanyl, thietanyl, homopiperidinyl, oxepanyl, thiepanyl, oxazepinyl, diazepinyl, thiazepinyl, 1,2,3,6-tetrahydropyridinyl, 2-pyrrolinyl, 3-pyrrolinyl, 2H-pyranyl, 4H-pyranyl, dioxanyl, 1,3-dioxolanyl, pyrazolinyl, dithianyl, dithiolanyl, dihydropyranyl, dihydrothienyl, dihydrofuranyl, pyrazolidinyl, imidazolinyl, imidazolidinyl, 3-azabicyclo[3,1,0]hexanyl, 3-azabicyclo[4,1,0]heptanyl, quinolizinyl, sugars, and the like. The term heterocycloalkyl includes both unsubstituted heterocycloalkyl groups and substituted heterocycloalkyl groups.

The term "aryl" refers to aromatic groups having 4n+2 π(pi) electrons, wherein n is an integer from 1 to 3, in a conjugated monocyclic or polycyclic system (fused or not) and having from six to fourteen ring atoms. A polycyclic ring system includes at least one aromatic ring. Aryl may be directly attached, or connected via a $C_1$-$C_3$alkyl group (also referred to as arylalkyl or aralkyl). Examples of aryl groups include, without limitation, phenyl, benzyl, phenethyl, 1-phenylethyl, tolyl, naphthyl, biphenyl, terphenyl, indenyl, benzocyclooctenyl, benzocycloheptenyl, azulenyl, acenaphthylenyl, fluorenyl, phenanthrenyl, anthracenyl, and the like. The term aryl includes both unsubstituted aryl groups and substituted aryl groups. The term "$C_6$-$C_n$aryl" refers to an aryl group having from 6 to the indicated "n" number of carbons in the ring structure.

The term "heteroaryl" includes refer to aromatic groups having 4n+2 π(pi) electrons, wherein n is an integer from 1 to 3, in a conjugated monocyclic or polycyclic system (fused or not) and having five to fourteen ring members, including one to six substituted or unsubstituted heteroatoms (e.g. N, O, S) or groups containing such heteroatoms (e.g. NH, $NR_x$ ($R_x$ is alkyl, acyl, aryl, heteroaryl or cycloalkyl), SO, and the like). A polycyclic ring system includes at least one heteroaromatic ring. Heteroaryls may be directly attached, or connected via a $C_1$-$C_3$alkyl group (also referred to as heteroarylalkyl or heteroaralkyl). Heteroaryl groups may be C-attached or heteroatom-attached (e.g. via a nitrogen atom), where such is possible.

The term "substituted", when in association with any of the foregoing groups refers to a group substituted at one or more position with appropriate substituents. Examples of substituents include, without limitation, cyano, halogen (e.g. F, Cl, Br), hydroxy, primary, secondary or tertiary amine, amide, nitro, azido, trifluoromethyl, lower alkyl, cycloalkyl, heterocycloalkyl, aryl, heteroaryl, lower alkoxy, aryloxy, benzyloxy, benzyl, carboxylate, alkoxycarbonyl, sulfonyl, sulfonate, sulfonamide, silane, siloxane, thiocarboxylate, phosphonato, phosphinato, oxo, and the like. Any of the above substituents can be further substituted if permissible, e.g. if the group contains an alkyl group, an alkoxy group, an aryl group, or other.

The present technology relates to polymers comprising monomeric units derived from vinylimidazole derivatives. For instance, these polymers are for use in electrochemical cells such as binders in electrode materials or as part of an electrolyte composition.

The present technology thus proposes polymers which may be used as polymeric binders in composite electrodes to improve their ionic conductivity, these polymers incorporating moieties with an affinity to ions, especially alkali or alkaline earth metal ions such as lithium ions. The use of such polymeric binders may decrease the electrode resistance, for example, at low temperature, and/or increase cell capacity. For instance, incorporating a vinylimidazole derivative monomer such as 2-vinyl-4,5-dicyanoimidazole, in the polymer may significantly reduce the electrode's resistance during the electrochemical reaction and thus increase the cell's capacity retention. The solubility of the present polymers, especially in their salt form may also reduce the need to use toxic solvents.

Here is proposed the use of an imidazole derivative polymer or of a copolymer of acrylic acid or a derivative thereof and an imidazole derivative (such as vinyldicyanoimidazole) in an electrode material binder, for instance, used as a co-binder with a compatible polymer such as poly(acrylic acid). This polymer or copolymer may also be part of an electrolyte composition, e.g. a solid or gel polymer electrolyte.

According to a first aspect, the polymer comprises monomeric units derived from a vinylimidazole derivative of Formula I:

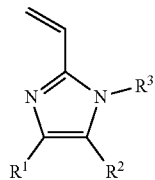

Formula I wherein,
$R^1$ and $R^2$ are each independently selected from H, CN, F, and optionally fluorinated $C_{1-6}$ alkyl; and
$R^3$ is selected from a hydrogen atom and an optionally substituted $C_{1-6}$ alkyl group;
or a salt thereof.

In Formula I, $R^1$ and $R^2$ may each be independently selected from CN and optionally fluorinated $C_{1-6}$alkyl. In one example, at least one of $R^1$ and $R^2$ is CN, or both are CN. In Formula I, $R^3$ may be a hydrogen atom, a methyl group or a trifluoromethyl group. For instance, $R^3$ is a hydrogen atom.

According to one example, the polymer comprises between 10 mol % and 90 mol % of monomeric units derived from a vinylimidazole derivative of Formula I, or between 10 mol % and 60 mol %, or between 15 mol % and 40 mol %, each upper and lower values being included.

Where the polymer is a copolymer, said copolymer may further comprise monomeric units derived from Formula II:

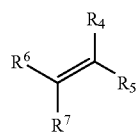

Formula II wherein,
$R^4$, $R^6$, and $R^7$ are each independently selected from a hydrogen atom and optionally substituted $C_{1-6}$alkyl; and $R^5$ is selected from —$CO_2H$, optionally substituted —$CO_2C_{1-6}$alkyl, —$C(O)NH_2$, optionally substituted —$OC_{1-6}$alkyl, optionally substituted $C_6$aryl, optionally substituted $C_{5-6}$heteroaryl, —CN, —$SO_3H$, —$SO_2NH_2$, and optionally substituted —$SO_3C_{1-6}$ alkyl; or
$R^5$ taken together with $R^7$ and their adjacent carbon atoms form a 5 or 6-membered heterocycle;
or a salt thereof.

In one example, at least one of $R^4$, $R^6$, and $R^7$ is H. In another example, two of $R^4$, $R^6$, and $R^7$ are H or each of $R^4$, $R^6$, and $R^7$ is H. In one example, $R^4$ is H. In another example, $R^4$ is an optionally substituted $C_{1-6}$alkyl group, e.g. a methyl group. In other examples, $R^5$ is —$CO_2H$ or $R^5$ is an optionally substituted —$CO_2C_{1-6}$alkyl group, for example, a —$CO_2$(glycidyl) group, or $R^5$ is an optionally substituted —$OC_{1-6}$alkyl group, for example, a —$O$(glycidyl) or —Obutyl group. Other examples include alternatives where $R^5$ taken together with $R^7$ and their adjacent carbon atoms form a 5-membered heterocycle, e.g. a maleic anhydride or maleimide group.

Non-limiting examples of salts of the polymers include alkali and alkaline earth metal salts. For instance, salts compatible with the other elements of an electrochemical cell in which the polymer is intended for use, e.g. a lithium salt, sodium salt, potassium salt, magnesium salt, and the like. The number average molecular weight of the polymer may range from 2 000 to 50 000 g/mol, or from 3 000 to 10 000 g/mol.

For example, the present polymer may be illustrated as a homopolymer of Formula III, or a salt thereof:

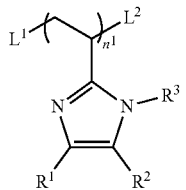

Formula III wherein,
$R^1$, $R^2$, and $R^3$ are as herein defined;
$L^1$ and $L^2$ are independently selected from H, an alkyl group, a residue of a polymerisation initiator, and a linker between two or more of the polymer chains; and
$n^1$ is an integer selected such that the number average molecular weight is, for instance, from 2 000 to 50 000 g/mol, or from 3 000 to 10 000 g/mol, or a salt thereof.

Examples of linkers include, without limitations, alkyl, alkoxyl, and aryl groups, each of which may be further substituted. In one example, $L^1$ and $L^2$ are independently linear or branched alkyl groups optionally comprising two or more functional groups comprising heteroatoms selected from oxygen, nitrogen and sulfur (e.g. groups including ether, ester, carboxamide, carbamate, urea, carbonate, their sulfur-containing equivalents, etc.) each attached to a polymer chain in a linear, star or comb configuration.

The present polymer may also be a copolymer, for instance, a random copolymer, block copolymer, star, branched or hyperbranched copolymer (e.g. including comb, dendritic, etc.). When the polymer is a copolymer, the copolymer comprises at least 10 mol % of monomeric units derived from a vinylimidazole of Formula I, or from about 10 mol % to about 50 mol %, for instance, from about 20 mol % to about 40 mol %, or about 30 mol %.

For example, the present polymer may be illustrated as a random or block copolymer of Formula IV, or a salt thereof:

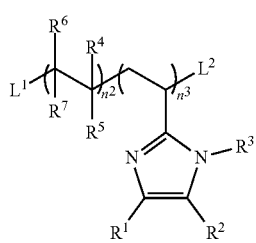

Formula IV wherein $R^1$, $R^2$, $R^3$, $R^4$, $R^5$, $R^6$, $R^7$, $L^1$ and $L^2$ are as herein defined, and $n^2$ and $n^3$ are integers representing the number of each monomeric units within the polymer and are selected such that the number average molecular weight is, for instance, from 2 000 to 50 000 g/mol, or from about 3 000 to about 10 000 g/mol, or a salt thereof. For example, the ratio $n^2:n^3$ may range from 9:1 to 1:1, or from 4:1 to 3:2, or about 7:3.

For example, the present polymer may be illustrated as a random or block copolymer of Formula V, or a salt thereof:

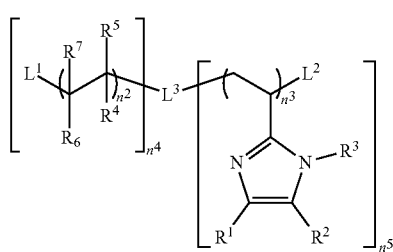

Formula V wherein $R^1$, $R^2$, $R^3$, $R^4$, $R^5$, $R^6$, $R^7$, $L^1$, $L^2$, $n^2$ and $n^3$ are as herein defined;

$L^3$ is selected from linear or branched alkyl groups and linkers between polymer chains, e.g. a crosslinkable or crosslinked monomer; and $n^4$ and $n^5$ are integers each selected from 1 to 4;

or a salt thereof.

For example, the ratio $(n^2 \times n^4):(n^3 \times n^5)$ may range from 9:1 to 1:1, or from 4:1 to 3:2, or about 7:3. In another example, $n^4+n^5=3$ or 4.

In one example, $L^3$ is selected from branched alkyl groups or functionalized branched alkyl groups, e.g. pentaerythritol tetra(alkylate ester) derivatives and other similar compounds.

The copolymers of the present technology could be made with different micro-structure such as block copolymers, statistical random copolymers, star copolymers, hyperbranched copolymers, graft copolymers, etc. In some cases, the copolymer may comprise a polymer of Formula III or IV and further comprise monomeric units comprising 2 or more polymerizable functional groups (e.g. double bond or other groups), for instance, having a star or comb configuration. The copolymer may also further comprise cross-linkable monomeric units.

Polymerization of the monomers may be accomplished by any known procedure and method of initiation, for instance, by radical polymerization. When the polymer is a homopolymer, it may be prepared by a polymerization process as illustrated in Scheme 1.

Scheme 1

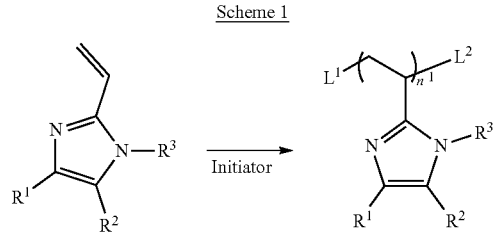

wherein $R^1$, $R^2$, $L^1$, $L^2$ and $n^1$ are as herein defined, or salts of the polymers. The initiator may any suitable polymerization initiator, such as peroxides (e.g. hydrogen peroxide, benzoyl peroxide, dicumyl peroxide), azo compounds (e.g. azobisisobutyronitrile (AIBN)), persulfates (e.g. potassium persulfate). Polymerization may be further initiated by photolysis, thermal treatment, and any other suitable means. For instance, polymerization may be initiated by ionizing radiation, electrolysis, etc.

The synthesis of a polymer comprising only monomeric units derived from Formula I when $R^1$ and $R^2$ are CN groups may be performed in a similar manner as the procedure described in Johnson, D. M. et al., *Macromolecules* 33.23 (2000): 8597-1999.

The synthesis of random copolymers may be performed by free radical polymerization as illustrated in Scheme 2:

Scheme 2

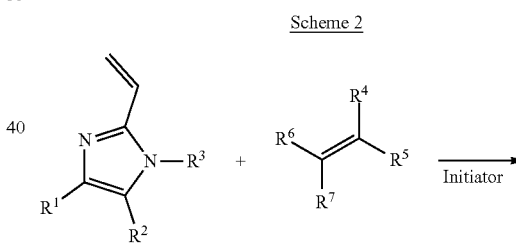

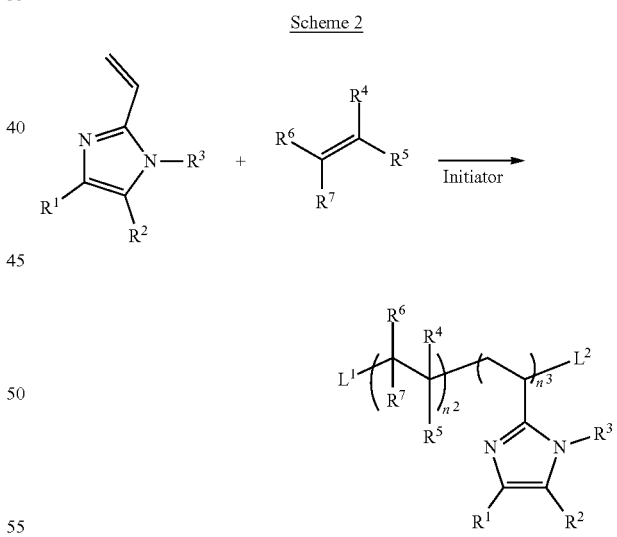

wherein $R^1$, $R^2$, $R^3$, $R^4$, $R^5$, $R^6$, $R^7$, $L^1$, $L^2$, $n^2$ and $n^3$ are as herein defined, or salts thereof. The initiator is as defined above.

Where the copolymer is a block copolymer, the synthesis may be achieved by reversible addition-fragmentation chain transfer polymerization (or RAFT). As an example of RAFT agent, S,S-dibenzyl trithiocarbonate displayed in Scheme 3 is specific for acrylic acid. Other known RAFT agents may also be used.

Scheme 3

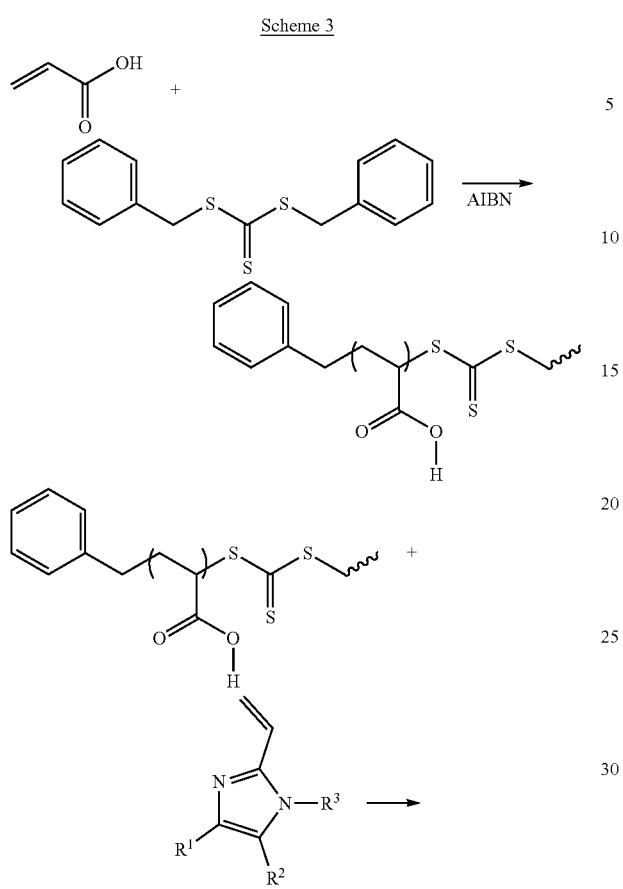

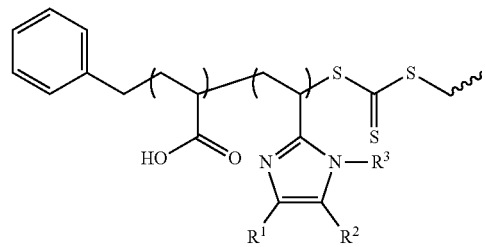

The polymer could also be prepared and used as its metallic salt form as defined above, e.g. as its lithiated salt form and dissolved in water or as its basic (neutral) form dissolved in NMP, MeCN, DMF or DMSO, for application on a support.

The block and star copolymer structures can be achieved using controlled radical polymerization, including RAFT polymerization, nitroxide-mediated radical polymerization and atom transfer radical polymerization.

Scheme 4 illustrates an example of a star copolymerization processes. This example comprises a first polymerization of acrylic acid with a star RAFT agent, i.e. pentaerythritol tetrakis[2-(dodecylthiocarbonothioylthio)-2-methylpropionate]. Each wavy line represents a polymer chain as herein defined, only one of such polymer chains being illustrated for clarity purposes.

Scheme 4

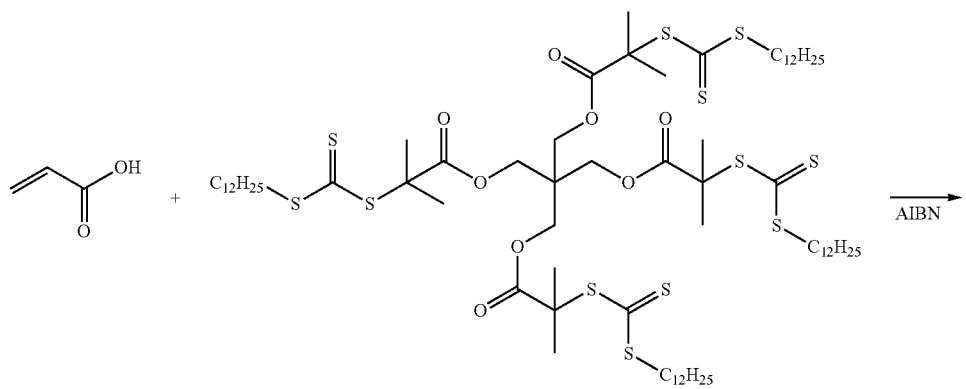

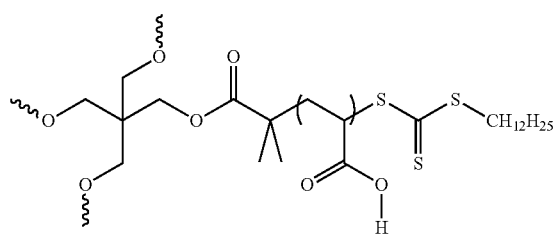

-continued

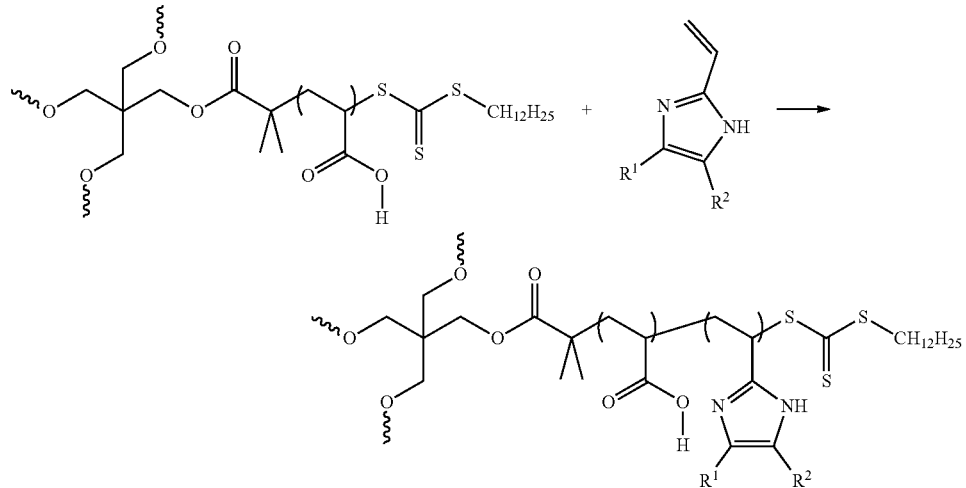

The present technology also relates to electrode materials comprising the polymer defined herein and an electrochemically active material, for instance in the form of particles. The electrochemically active material may be a material for use in a negative electrode or a positive electrode. Non-limitative examples of electrochemically active materials include titanates and lithium titanates (e.g. $TiO_2$, $Li_2TiO_3$, $Li_4Ti_5O_{12}$, $H_2Ti_5O_{11}$, $H_2Ti_4O_9$, or a combination thereof), lithium metal phosphates and metal phosphates (e.g. LiM'$PO_4$ and M'$PO_4$ where M' is Fe, Ni, Mn, Co, or a combination thereof), vanadium oxides (e.g. $LiV_3O_8$, $V_2O_5$, $LiV_2O_5$, and the like), and other lithium and metal oxides such as $LiMn_2O_4$, LiM"$O_2$ (M" being Mn, Co, Ni, or a combination thereof), Li(NiM''')$O_2$ (M''' being Mn, Co, Al, Fe, Cr, Ti, Zr, and the like, or a combination thereof), or a combination of any of the above materials when compatible. For instance, the active material is selected from lithium iron phosphate (LFP), lithium manganese iron phosphate (LMFP), lithium titanate (LTO), graphite, and lithium nickel manganese cobalt oxide (NMC). Other electrochemically active materials may also further include carbon sources such as graphite. The particles may be freshly formed or of commercial source, in the form of microparticles or nanoparticles and may further include a coating such as a carbon coating.

The electrode material may also optionally include additional components like conductive materials, salts, inorganic particles, glass or ceramic particles, and the like. Examples of conductive materials include carbon black, Ketjen™ black, acetylene black, graphite, graphene, carbon fibers, nanofibers (e.g. VGCF) or nanotubes, or a combination thereof.

Electrodes comprising the present electrode material may be manufactured by preparing an electrode composition including the electrochemically active material, a polymer as defined herein and optional additional elements, including conductive agent, etc. Preparation of the electrode material may be made by dry or wet mixing (e.g. in the presence of a solvent), for instance, by techniques such as mechanofusion, planetary mixer, and the like. The composition is then applied on a support (e.g. current collector), for instance, by spreading by the «Doctor blade» method, by casting, coating, dip-coating, extrusion, calendering, and other methods known in the art. In the case of wet mixing, the electrode material is then dried to remove any traces of the solvent used during the mixing step. The drying may include an initial heating step at normal pressure followed by a drying step performed by heating under vacuum.

When used in an electrode binder, the polymer (the first polymer) as herein defined may be present at a concentration of up to 10 wt % in the total weight of the electrode material, or up to 5 wt %, at a concentration of between 0.1 wt % and 5 wt %, or between 0.4 wt % and 3 wt %, 0.5 wt % and 2 wt % or between 1 wt % and 2 wt %. The binder composition may further comprise a second polymer, for instance, selected from polymers based on glycidyl, acrylic or methacrylic acid, vinyl alkyl ether, thiol-containing monomers, and the like. For example, the second polymer is a polymer comprising monomeric units based on compounds of Formula II, such polymer being free of monomeric units derived from vinylimidazoles of Formula I, for instance, a homopolymer of monomeric units based on compounds of Formula II. In one example, the second polymer is a poly(acrylic acid) or poly(methacrylic acid) polymer, preferably poly (acrylic acid). In other examples, the second polymer is selected from fluorine containing polymers (e.g. PVdF, PTFE, etc.), water soluble binders (e.g. SBR (styrene butadiene rubber), NBR (butadiene acrylonitrile rubber), HNBR (hydrogenated NBR), CHR (epichlorohydrin rubber), ACM (acrylate rubber)), cellulose-based binders (e.g. carboxyalkylcellulose, hydroxyalkylcellulose, and combinations), or any combination of two or more of these. For instance, the carboxyalkylcellulose may be carboxymethylcellulose (CMC) or carboxyethylcellulose. Other examples of second polymers include ion-conductive polymer binders such as block copolymers composed of at least one lithium-ion solvating segment and at least one cross-linkable segment (e.g. PEO-based polymers comprising methyl methacrylate units). The weight ratio of the first polymer (as herein defined) to the second polymer may be within the range of from 1:9 to 7:3, or from 1:4 to 3:2, or from about 1:3 to about 1:1, or from about 1:2 to about 1:1.

The second polymer may serve, for example, to adjust one or more properties of the electrode material, e.g. adhesion of the electrode material to the adjacent elements of the cell, e.g. the current collector and/or polymer electrolyte. The combination of the two polymers may provide the right balance between adhesion and flexibility.

The polymer may also be used in a composition for coating particles of the electrochemically active material as herein defined, i.e. the coating composition serving as a shell in a core-shell structure. The shell composition may comprise a polymer as herein defined at a concentration of, for example, between 5 wt % and 100 wt %, or between 10 wt % and 50 wt %, or between 25 wt % and 75 wt %, or between 50 wt % and 100 wt %, or between 5 wt % and 25 wt %, or between 40 wt % and 75 wt %. Such a shell composition may further include additional elements as for the aforementioned binder compositions. When the present polymer is used as a shell composition, the electrode composition herein described may further include a binder, comprising or not a polymer as herein defined.

The present polymer may also be used in an electrolyte composition, for instance, in a gel or solid polymer electrolyte. As an example, the concentration of the present polymer within the electrolyte composition may be up to 50%, up to 10 wt %, or up to 5 wt %, for example, at a concentration of between 0.1 wt % and 5 wt %, or between 0.4 wt % and 3 wt %, 0.5 wt % and 2 wt % or between 1 wt % and 2 wt %. For instance, the electrolyte composition may further comprise a second polymer. Examples of second electrolyte polymers include those describe for the binder composition. For instance, the second polymer electrolyte may be a PEO-based polymer, PVdF, CMC or PVA (polyvinyl acetate). Other examples of polymers may be used as second polymer in electrolyte compositions, e.g. polyethyleneglycol-based polymers such as poly(ethylene glycol) methyl acrylate or methacrylate, etc. Various additives may also be included in the polymer electrolyte composition to improve its properties, including salts compatible with the other elements of the electrochemical cell or inorganic materials.

Electrochemical cells and batteries comprising them are also herein contemplated, wherein at least one element of the electrochemical cells comprises the present polymer. Such element may be an electrode material, electrolyte composition or counter-electrode material. In one example, the electrode comprises an electrode material as herein defined. In another example, the electrolyte comprises an electrolyte composition as herein defined. In another example, the electrode comprises an electrode material as herein defined, and the electrolyte comprises an electrolyte composition as herein defined. In a further example, the electrode and counter-electrode each independently comprise an electrode material as herein defined. In yet another example, the electrode and counter-electrode each independently comprise an electrode material as herein defined, and the electrolyte comprises an electrolyte composition as herein defined. For instance, the battery is a lithium or lithium-ion battery, e.g. a rechargeable battery. In other examples, the battery is a sodium or potassium battery.

In cases where one of the electrode material or the counter-electrode material comprises a polymer as herein defined, the electrolyte may be a liquid, gel or solid electrolyte compatible with the electrochemically active materials of the electrode and counter-electrode. For instance, where the electrolyte is a liquid electrolyte comprising a salt dissolved in an electrolyte solvent, the electrolyte may further comprise a separator. The electrolyte may also be a solid or gel solution of a salt in a polar solvating polymer. Examples of electrolyte salts include lithium salts such as LiTFSI, LiPF$_6$, LiDCTA, LiBETI, LiFSI, LiBF$_4$, LiBOB, and combinations thereof. Examples of solid polar solvating polymers comprise linear, branched and/or cross-linked polyether polymers, such as those based on poly(ethylene oxide) (PEO), poly(propylene oxide) (PPO), or on a mixture thereof, optionally further including cross-linkable units.

Other additives may be present in electrolyte compositions such as glass particles, ceramics, for instance, nano-ceramics (e.g. Al$_2$O$_3$, TiO$_2$, SiO$_2$, and other similar compounds). These may be added to the polymer electrolyte matrix to improve its mechanical properties and thus limit the formation of dendrites of the salt (Li, Na, etc.) during charging.

For more certainty, the electrochemically active material of the counter-electrode may be selected from any known material, including the electrochemically active material (selected for redox compatibility with the electrode active material) defined above as well as alkali metal films, e.g. metallic lithium film or an alloy thereof. As one may expect, the counter-electrode material may not include the present polymer when it consists of a film of metallic material.

In one example, the electrode electrochemically active material comprises a lithium metal phosphate or metal phosphate (e.g. LiFePO$_4$, LiMnPO$_4$, LiMnFePO$_4$ and the like) and the counter-electrode electrochemically active material comprises a titanate or lithium titanate (e.g. Li$_4$Ti$_5$O$_{12}$). In another example, the electrode electrochemically active material comprises a lithium metal phosphate or metal phosphate and the counter-electrode electrochemically active material comprises a metallic lithium film.

According to another aspect, described is the use of the electrochemical cell as herein defined in electrical or hybrid vehicles, or in ubiquitous information technology devices. For instance, contemplated uses include mobile devices, such as mobile phones, cameras, tablets or laptops, electric or hybrid vehicles, or in the storage of renewable energy.

EXAMPLES

The following non-limiting examples are illustrative embodiments and should not be construed as further limiting the scope of the present invention. These examples will be better understood with reference to the accompanying figures.

Example 1: Homopolymerization (a) Homopolymerization of 2-vinyl-4,5-dicyanoimidazole This example illustrates the homopolymerization of 2-vinyl-4,5-dicyanoimidazole. To perform this polymerization, 1.5 g of vinylimidazole derivative and 50 mL of acetonitrile or dioxane, was introduced in a round-bottomed flask and the solution was bubbled with nitrogen for 30 minutes to remove oxygen. 58 mg of AIBN was then added and the solution was heated to 70° C. under nitrogen for at least 12 hours. The polymer was then purified by precipitation in 10 volumes of toluene or a mixture of hexanes and diethyl ether (2:1), separated and dried under vacuum for 12 hours.

A standard production yield obtained using the procedure described in Example 1(a) was about 95%.

(b) Homopolymerization of Lithiated 2-vinyl-4,5-dicyanoimidazole

This example illustrates the homopolymerization of lithiated 2-vinyl-4,5-dicyanoimidazole. To perform this polymerization, 1.5 g of vinylimidazole derivative, 0.4 g of lithium hydroxide and 20 mL of demineralised water are introduced in a round-bottomed flask. The solution is stirred at room temperature for 1 hour and then bubbled with nitrogen for 30 minutes to remove oxygen. 36 mg of potassium persulfate $K_2S_2O_8$ (KPS) is then added and the solution is heated to 90° C. under nitrogen for at least 24 hours. The polymer is then purified by precipitation in 10 volumes of acetonitrile, separated and dried under vacuum for 12 hours.

Example 2: Copolymerization (a) Random Copolymerization of 2-vinyl-4,5-dicyanoimidazole and Acrylic Acid This example illustrates the copolymerization of 2-vinyl-4,5-dicyanoimidazole and acrylic acid. To perform this copolymerization, 0.40 g of vinylimidazole derivative, 0.50 g of acrylic acid and 15 mL of acetonitrile or dioxane, were introduced in a round-bottomed flask and the solution was bubbled with nitrogen for 30 minutes to remove oxygen. 12 mg of AIBN was then added and the solution was heated to 70° C. under nitrogen for at least 12 hours. The polymer was then purified by precipitation in 10 volumes of toluene or a mixture of hexanes and diethyl ether (2:1), separated and dried under vacuum for 12 hours.

A standard production yield obtained using the procedure described in Example 2(a) was about 50-60%.

(b) Random Copolymerization of Lithiated 2-vinyl-4,5-dicyanoimidazole and Acrylic Acid This example illustrates the random copolymerization of lithiated 2-vinyl-4,5-dicyanoimidazole and acrylic acid. To perform this copolymerization, 0.40 g of vinylimidazole derivative, 0.26 g of lithium hydroxide monohydrate and 50 mL of demineralized water were introduced in a round-bottomed flask. The solution was stirred for 1 hour at room temperature to solubilize the imidazole derivative in water. Once solubilized, 0.50 g of acrylic acid was introduced in the round-bottomed flask and the solution obtained was bubbled with nitrogen for 30 minutes to remove oxygen. 25 mg of KPS was added and the solution was heated to 80° C. under nitrogen for at least 48 hours. The polymer obtained using this procedure was then purified by precipitation in 10 volumes of acetonitrile and dried under vacuum for 12 hours.

A standard production yield obtained using the procedure described in Example 2(b) was about 74%.

(c) Block Copolymerization of 2-vinyl-4,5-dicyanoimidazole and Acrylic Acid

This procedure comprises 2 steps in which the first step comprises the block copolymerization of poly(acrylic acid) by RAFT polymerization. To perform this copolymerization, 3.09 g of acrylic acid, 0.102 g of S,S-dibenzyl trithiocarbonate (RAFT CTA) and 15 mL of dioxane were introduced in a round-bottomed flask. The solution was stirred at room temperature and bubbled with nitrogen for 30 minutes to remove oxygen. 31.8 mg of AIBN was added and the solution was heated to 80° C. under nitrogen for at least 6 hours. The polymer was then purified by precipitation in 10 volumes of hexanes or toluene and dried under vacuum for 12 hours.

The second step comprises the formation of the second block comprising vinylimidazole monomer units. In this step, 1.0 g of the previous polymer (PAA-RAFT), 2.0 g. of imidazole derivative and 50 ml of dioxane were added in a round-bottomed flask. The solution was stirred at room temperature and bubbled with nitrogen for 30 minutes to remove oxygen. 47 mg of AIBN was then added to the reaction mixture and the solution was heated at 90° C. under nitrogen for at least 24 hours. The polymer was then purified by precipitation in 10 volumes of a mixture of hexanes and diethyl ether (2:1) and dried under vacuum for 12 hours.

A standard production yield obtained using the procedure described in Example 2(c) was about 82%.

Example 3: Star Copolymerization of Block Copolymers of 2-vinyl-4,5-dicyanoimidazole and Acrylic Acid This process is a 2 steps process in which the first step describes the block copolymerization of poly(acrylic acid) by RAFT polymerization. To perform this copolymerization, 3.09 g of acrylic acid, 0.104 g of the 4 arms RAFT agent pentaerythritol tetrakis[2-(dodecylthiocarbonothioylthio)-2-methylpropionate] (DDMAT RAFT) and 15 mL of dioxane are introduced in a round-bottomed flask. The solution is stirred at room temperature and bubbled with nitrogen for 30 minutes to remove oxygen. 31.8 mg of the initiator AIBN is added and the solution is heated to 80° C. under nitrogen for at least 6 hours. The polymer is then purified by precipitation in 10 volumes of hexanes or toluene and dried at 80° C. under vacuum for 12 hours. The polymer is stored at 4° C.

The second step of Example 3 describes the formation of the second block comprising the vinylimidazole. The preparation consists of adding 1.0 g of the previous polymer (PAA-RAFT), 2.0 g of imidazole derivative and 50 ml of dioxane in a round-bottomed flask. The solution is stirred at room temperature and bubbled with nitrogen for 30 minutes to remove oxygen. 47 mg of the initiator AIBN is added in the flask and the solution is heated to 90° C. under nitrogen for at least 24 hours. The polymer is then purified by precipitation in 10 volumes of a mixture of hexanes and diethyl ether (2:1) and dried at 60° C. under vacuum for 12 hours.

Example 4: Preparation of Cells (a) Cathodes

Examples of cathodes (C3, C4, and C6) comprising a polymer as defined herein and reference cathodes (C1, C2, and C5) for comparative purposes were prepared in the weight ratios detailed in Table 1.

TABLE 1

| | Cathode material weight concentration | | | |
| --- | --- | --- | --- | --- |
| Cathode | EAM$^a$ (wt %) | Carbon (wt %) | Polymer 1 (wt %) | Polymer 2 (wt %) |
| C1 | C-LFP (90%) | C-Black (5%) | — | PVdF (5%) |
| C2 | C-LFP (91%) | C-Black (5%) | — | SBR (2.5%) CMC (1.5%) |
| C3 | C-LFP (90%) | C-Black (5%) | Ex. 2(a) (2%) | PAA$^b$ (3%) |

TABLE 1-continued

Cathode material weight concentration

| Cathode | EAM[a] (wt %) | Carbon (wt %) | Polymer 1 (wt %) | Polymer 2 (wt %) |
|---|---|---|---|---|
| C4 | C-LFP (91%) | C-Black (5%) | Ex. 2(b) (2%) | PAA-Li[b] (2%) |
| C5 | C-LFP (91%) | C-Black (5%) | — | PAA[b] (5%)/NMP |
| C6 | C-LFP (91%) | C-Black (5%) | Ex. 1(b) (1%) | PAA-Li[b] (3%) |

[a]EAM: Electrochemically active material,
LFP: LiFePO$_4$
[b]PAA: 450 000 g/mol The materials were prepared by mixing the electrochemically active material, carbon and polymer(s) in a solvent to obtain a slurry using a planetary centrifugal deaeration mixer from Thinky Corporation. The solvent used in the preparation of the materials of Cathodes C1, C3 and C5 was NMP while the solvent used for Cathodes C2, C4 and C6 was water. In the preparation of the material of Cathode C3, the PAA and Polymer 1 were used as solutions in NMP respectively at concentrations of 11% and 10%. Similarly, in the preparation of the material of Cathode C4, the PAA and Polymer 1 were used as solutions in water respectively at concentrations of 10% and 6.5%. The slurries obtained were then casted on aluminum current collectors using the Doctor blade method and dried.

(b) Anodes

Example of anode (A2) comprising the polymer as defined herein and a reference anode (A1) for comparative purposes were prepared in the weight ratios detailed in Table 2.

TABLE 2

Anode material weight concentration

| Anode | EAM[a] (wt %) | Carbon (wt %) | Polymer 1 (wt %) | Polymer 2 (wt %) |
|---|---|---|---|---|
| A1 | LTO (90%) | C-Black (5%) | — | PVDF (5%) |
| A2 | LTO (91%) | C-Black (5%) | Ex. 2(c) (2%) | PAA (2%) |
| A3 | LTO (91%) | C-Black (5%) | Ex. 2(c) (1%) | PAA (3%) |
| A4 | LTO (91%) | C-Black (5%) | — | SBR (2.5%) CMC (1.5%) |

[a]EAM: Electrochemically active material,
LTO: Li$_4$Ti$_5$O$_{12}$

Anode materials were prepared by mixing the electrochemically active material, carbon and polymer(s) in water to obtain a slurry using a planetary centrifugal deaeration mixer from Thinky Corporation. In the preparation of the material of Anode A2, Polymer 1 was used as a solution in water at a concentration of 6.5%. The slurries obtained was then casted on aluminum current collectors using the Doctor blade method and dried.

(c) Cells

All cells were assembled with standard 2032 size coin cell casings (i.e. 20 mm diameter and 3.2 mm height), 16 μm polyethylene-based separators impregnated with a 1 mol/kg LiPF$_6$ solution in PC/DMC/EMC (4:3:3) as a liquid electrolyte.

TABLE 3

LFP/LTO cell configurations

| Cell | Cathode | Anode |
|---|---|---|
| Cell 1 | C1 | A1 |
| Cell 2 | C5 | A1 |

TABLE 3-continued

LFP/LTO cell configurations

| Cell | Cathode | Anode |
|---|---|---|
| Cell 3 | C3 | A1 |
| Cell 4 | C2 | A1 |
| Cell 5 | C6 | A1 |
| Cell 6 | C4 | A1 |
| Cell 7 | C1 | A2 |

Cells or half-cells comprising the cathode material C3, the cathode material C1 (comparative), the anode material A3, or the anode material A4 (comparative) with lithium metal counter-electrodes were also assembled as described in the present example.

Example 5: Electrochemical Properties

Prior to the electrochemical testing, LFP/LTO cells, the LFP/Li cells and LTO/Li half-cells were submitted twice to a charge and discharge cycle at 0.2 C at 25° C.

In this Example, xC was the current to fully charge/discharge cell capacity in 1/x hour. For example, 1 C, 2C, 4C and 10C were representing respectively the current to charge or discharge at full capacity in 1 hour, 30 minutes, 15 minutes, and 6 minutes.

For the LFP/Li cells the charges were performed in the constant current-constant voltage (CC-CV) mode, the voltage was 3.9 V, the current was 0.2 C and the cut off current was 0.03 mA. The discharges were performed in the constant current (CC) mode, the cut off voltage was 2.0 V and current was 0.2 C.

For the LTO/Li half-cells the charges were performed in CC-CV mode, the voltage was 1.0 V, the current was 0.2 C and the cut off current was 0.03 mA. The discharges were performed in the CC mode, the cut off voltage was 2.7 V and current was 0.2 C.

For the LFP/LTO cells, the charges were performed in the CC-CV mode, the voltage was 2.4 V, the current was 0.2 C and the cut off current was 0.03 mA. The discharges were performed in the CC mode, the cut off voltage was 0.5 V and current was 0.2 C.

P(AA-Co-2-Vinyl-4,5-Dicyanoimidazole) Load Test

The effect of PAA-2-vinyl-4,5-dicyanoimidazole on the power performance was determined by performing load tests.

LFP/Li cells, comprising the cathode C3 or the cathode C1 (comparative), were assembled as described in Example 4 then, charged and discharged at 0.2 C, 1.0 C, 4.0 C and 10.0 C. Subsequently, the cells were submitted to a full charge and discharge once again at 0.2 C.

LFP/LTO cells were assembled as described in Example 4 then, charged and discharged at 0.2 C, 1.0 C, 2.0 C, 4.0 C, 10.0 C. Subsequently, the cells were submitted to a full charge and discharge once again at 0.2 C.

To perform the charge load test, after fully discharging at 0.2 C, LFP/LTO cells and LFP/Li cells were charged at 1 C and then charged again at 0.2 C. Afterwards, the cells were discharged at 0.2 C and charged at 2 C.

To perform the discharge load test, after fully charging at 0.2 C, LFP/LTO cells and LFP/Li cells were discharged at 1 C and then discharged again at 0.2 C. Afterwards, the cells were charged at 0.2 C and discharged at 2 C.

The capacity retention percentage was calculated using the following equation:

$$\text{Capacity retention (\%)} = \frac{(\text{Capacity at } xC)}{(\text{Capacity at } 0.2\ C)} \times 100 \quad (1)$$

For the LFP/Li cells, the capacity in the CC region was used for the calculation of the charge load characteristics. The charges were, once again, performed in the CC-CV mode, the voltage was 2.4V, the current was xC and the cut off current was 0.03 mA. The discharges were then performed in the CC mode, the cut off voltage was 0.5 V and the current was xC.

For LFP/LTO cells, the capacity in the CC region was used for the calculation of the charge load characteristics. The charges were, once again, performed in the CC-CV mode, the voltage was 2.4V, the current was xC and the cut off current was 0.03 mA. The discharges were then performed in the CC mode, the cut off voltage was 0.5 V and the current was xC.

a) Impedance

LFP/Li Cells

Electrochemical impedance spectroscopy (EIS) was performed on LFP/Li cells. FIG. 1 displays an impedance spectrum recorded with this system at a temperature of 25° C. As shown in FIG. 1, an LFP/Li cell, comprising the cathode material C3, that was prepared according to the procedure of Example 4, displayed less resistance at 25° C. compared with a reference LFP/Li cell comprising the cathode material C1 using PVDF as binder.

LTO/Li Half-Cells

Figure 2:
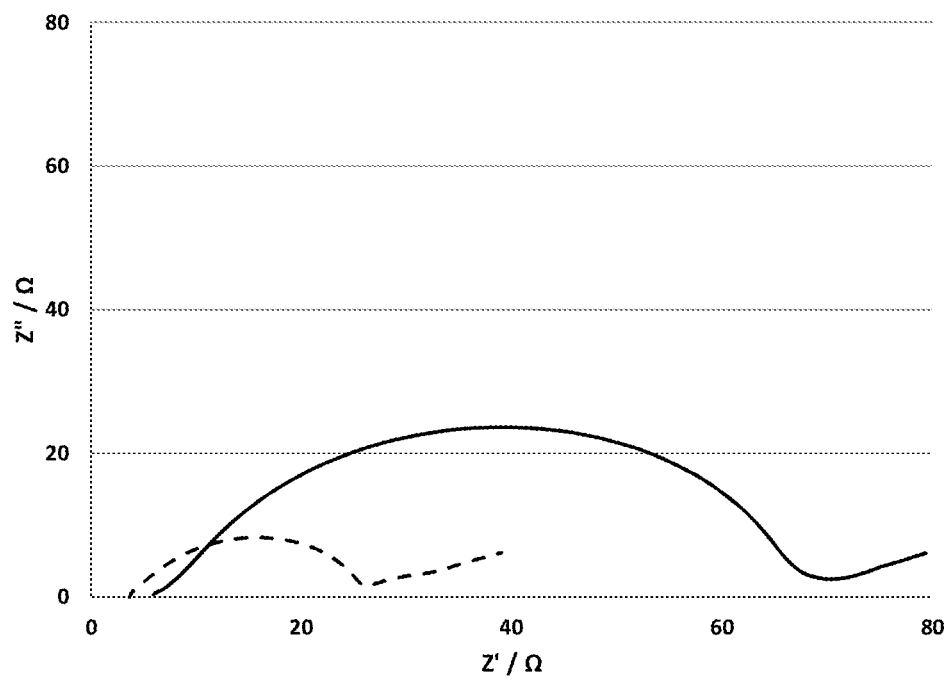
FIG. 2 displays an electrochemical impedance spectrum recorded with LTO/Li half-cells. The discontinued line is recorded with a LTO/Li half-cell comprising the anode material A3 (i.e. comprising P(AA-co-2-vinyl-4,5-dicyanoimidazole) and the full line is recorded with a reference LTO/Li half-cell comprising the anode material A4 using a CMC/SBR binder.

EIS was also performed on LTO/Li half-cells. FIG. 2 displays an impedance spectrum recorded with this system at a temperature of 25° C. As shown in FIG. 2, an LTO/Li half-cell, comprising the anode material A3, that was prepared according to the procedure of Example 4, displayed less resistance compared with a reference LTO/Li half-cell comprising the anode material A4 using a CMC/SBR binder.

LFP/LTO Cells

Figure 3:
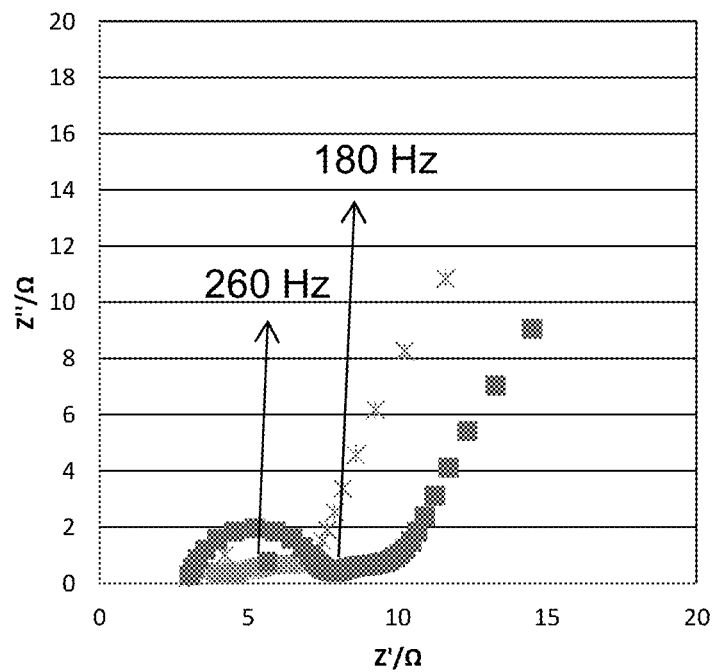
FIG. 3 displays an electrochemical impedance spectrum recorded with a LFP/LTO cell at a state of charge of 50%. The square line is the reference cell (Cell1) and the star line represents a cell comprising P(AA-co-2-vinyl-4,5-dicyanoimidazole) (Cell 3).

As shown in FIG. 3, Cell 3 that was prepared according to the procedure of Example 4, displayed less resistance at 25° C. compared with LFP using PVDF as binder (Cell 1). The resistance at the end of the semi-circle of the reference is 4.5 Ohm for Cell 1 while it is 1.0 Ohm for Cell 3. The EIS was performed using the LFP/LTO coin cell mentioned above at a state of charge of 50%, with a frequency range of 1 MHz to 10 mHz and an AC amplitude of 10 mV.

TABLE 4

| | Impedance | | | |
|---|---|---|---|---|
| | 1 | 2 | 3 | 4 |
| | $R_{sol}$ (Ohm) | | | |
| | 2.65 | 5.96 | 3.68 | 1.85 |
| | $R_1$ (Ohm) | | | |
| | 23.7 | 67.7 | 26.0 | 17.8 | b) Impedance at Low Temperature

Figure 4:
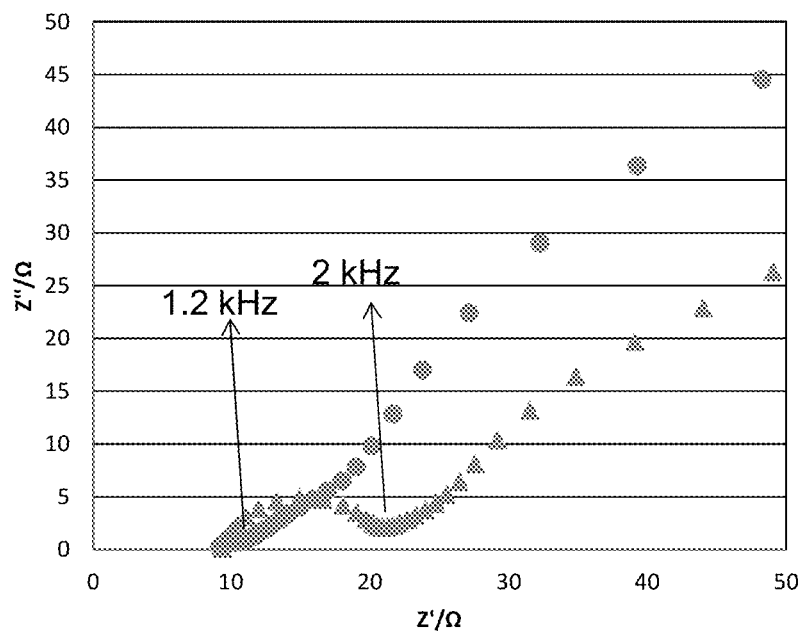
FIG. 4 displays an electrochemical impedance spectrum recorded with a LFP/LTO cell recorded at a temperature of −30° C. and a state of charge of 50%. The triangle line is the reference cell (Cell1) and the circle line is a cell comprising P(AA-co-2-vinyl-4,5-dicyanoimidazole) (Cell 3).

The positive influence of the 2-vinyl-4,5-dicyanoimidazole monomer in the polymer was also observed at low temperature. FIG. 4 displays the Nyquist plot at −30° C. The resistance at the end of the semi-circle of the reference is 19 Ohm for Cell 1 while the resistance for Cell 3 is 11 Ohm. The EIS was performed using the LFP/LTO coin cell mentioned above at a state of charge of 50%, with a frequency range of 1 MHz to 10 mHz and an AC amplitude of 10 mV.

c) Capacity Retention of LFP/Li Cells after Charge-Discharge Cycles

Figure 5A:
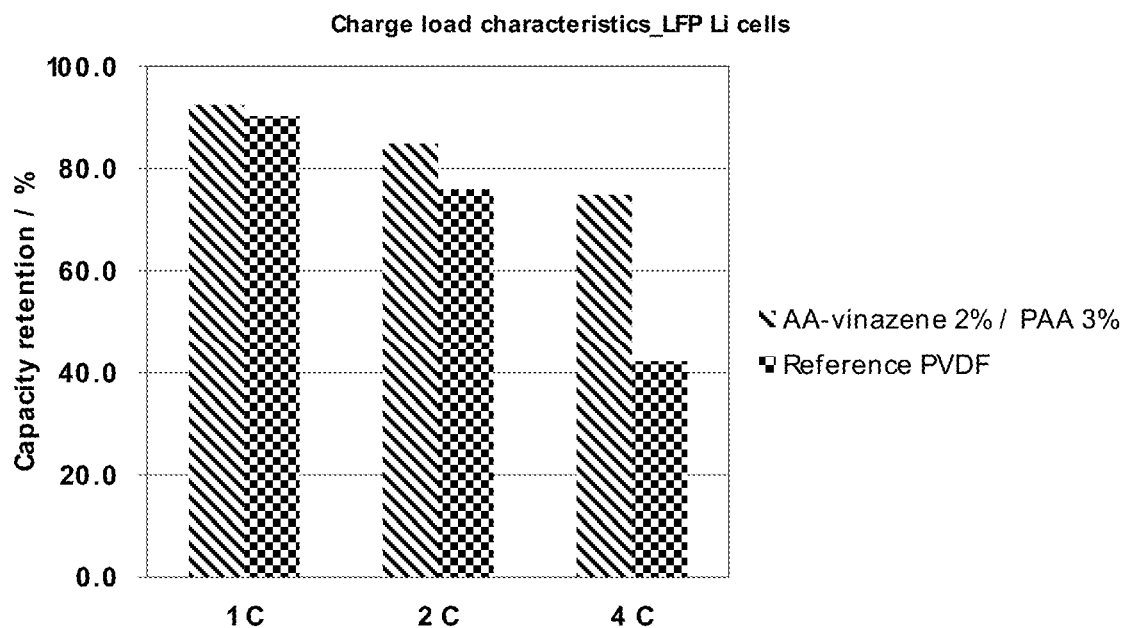
FIGS. 5A and 5B display a graph of the charge in FIG. 5A and discharge in FIG. 5B load characteristics of LFP/Li cells. The capacity retention after charge-discharge cycles was evaluated at different charge and discharge rates (1 C, 2 C and 4 C) and recorded at a temperature of 25° C. The results are presented for a reference LFP/Li cell comprising the cathode material $C^3$ and a reference LFP/Li cell comprising the cathode material C1.
Figure 5B:
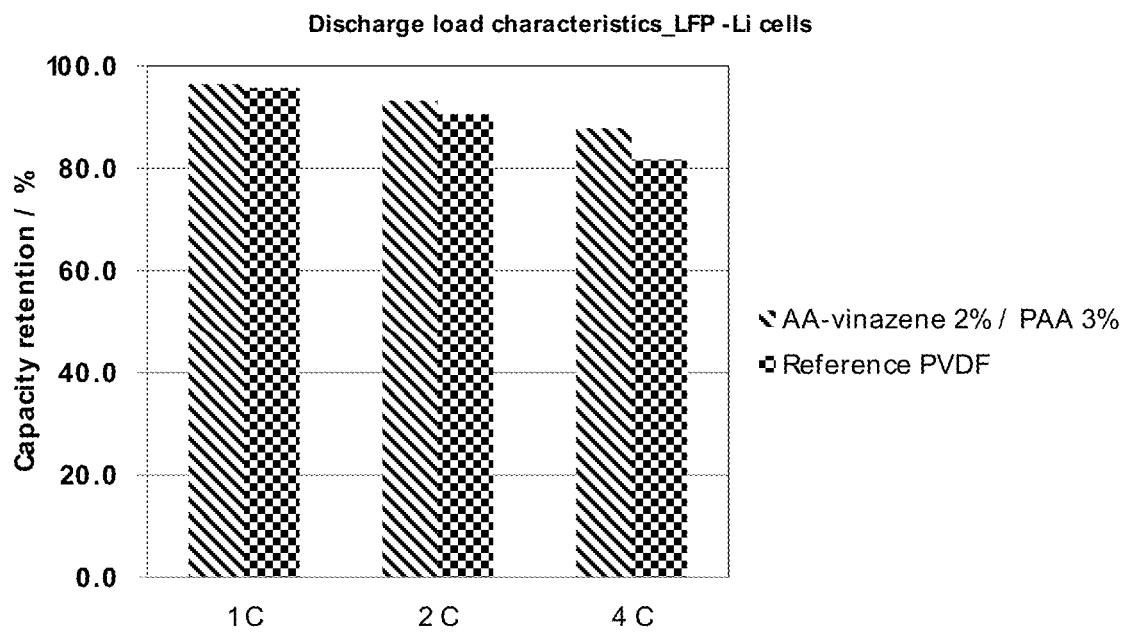
Figure 6A:
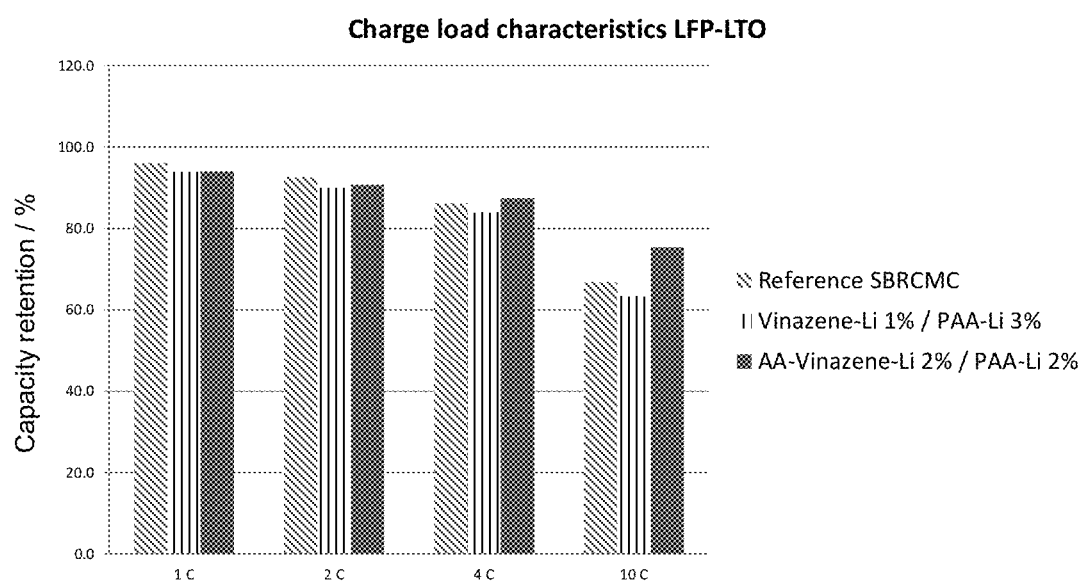
FIGS. 6A and 6B display a graph of the charge in FIG. 6A and discharge in FIG. 6B load characteristics of LFP/LTO cells. The capacity retention was evaluated at different charge and discharge rates (1 C, 2 C, 4 C and 10 C) and recorded at a temperature of 25° C. The results are presented for the reference Cell 4 (see table 3), for Cell 5 (see table 3) and for Cell 6 (see table 3).
Figure 6B:
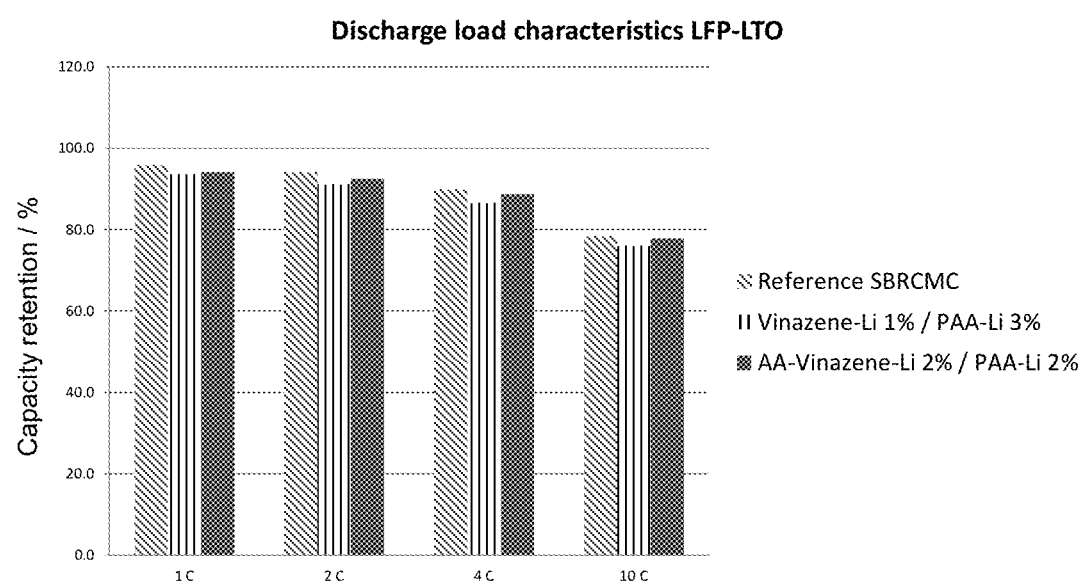

The effect of PAA-2-vinyl-4,5-dicyanoimidazole on the power performance of LFP/Li cells was determined by performing load tests. FIGS. 5A and 5B display a graph of the charge in FIG. 5A and discharge in FIG. 5B load characteristics of an LFP/Li cell, comprising the cathode material C3 (i.e. comprising P(AA-co-2-vinyl-4,5-dicyanoimidazole)) and of a reference LFP/Li cell comprising the cathode material C1 using PVDF as binder. The capacity retention after charge-discharge cycles was evaluated at different charge and discharge rates (1C, 2C and 4C) and recorded at a temperature of 25° C. As shown in FIGS. 5A and 5B, the presence of PAA-2-vinyl-4,5-dicyanoimidazole in a LFP/Li cell has a significant influence on the capacity retention and an even greater one at high charge and discharge rates.

d) Capacity Retention of LFP/LTO Cells after Charge-Discharge Cycles at Various Temperatures The influence of the 2-vinyl-4,5-dicyanoimidazole on the capacity retention is also significant at high charge and discharge rates (4 C and 10 C) as demonstrated in FIGS. 6A and 6B for LFP/LTO coin cells (Cell 4 compared to Cells 5 and 6) at 25° C.

Figure 7A:
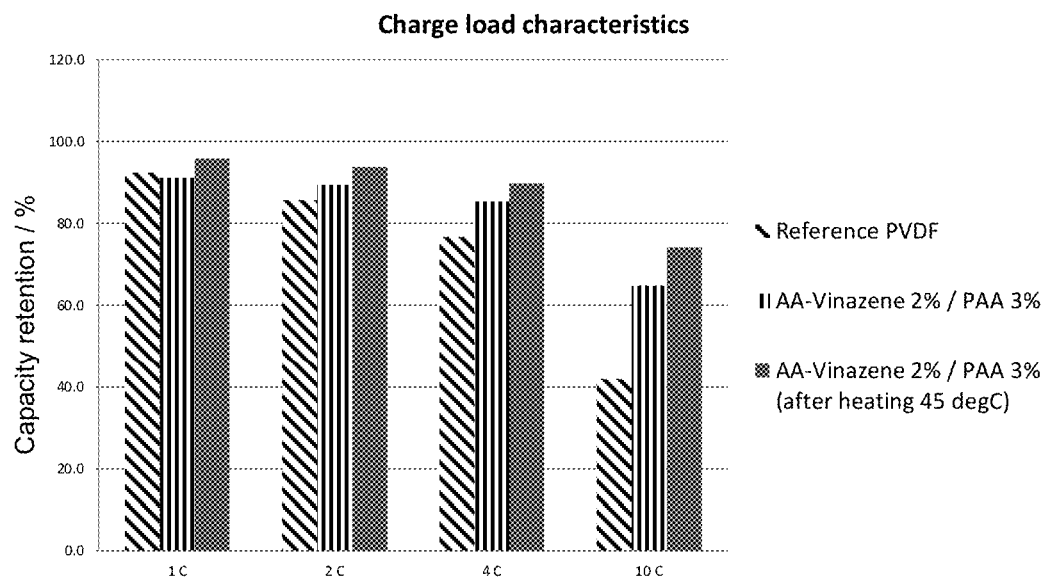
FIGS. 7A and 7B display a graph of the charge in FIG. 7A and discharge in FIG. 7B load characteristics of LFP/LTO cells. The capacity retention was evaluated at different charge and discharge rates (1 C, 2 C, 4 C and 10 C) and recorded at a temperature of 25° C. The results are presented for the reference Cell 1 (see table 3), for Cell 3 (see table 3) and for Cell 3 after heating it at 45° C.
Figure 7B:
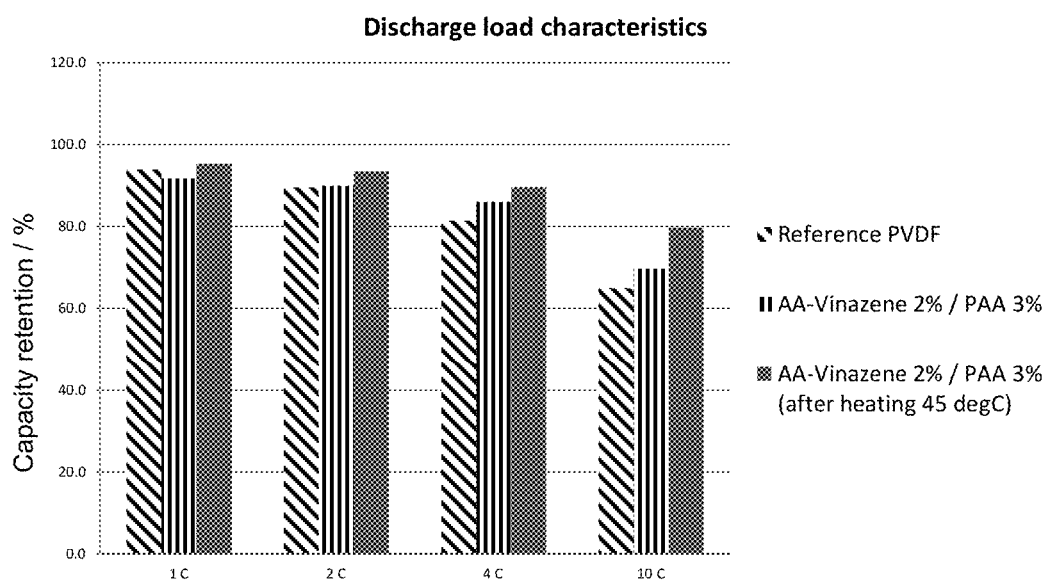

The influence of the 2-vinyl-4,5-dicyanoimidazole on the capacity retention is even greater after heating the cell at 45° C. as demonstrated in FIGS. 7A and 7B for LFP/LTO coin cells (Cell 1 compared to Cell 3 and Cell 3 after heating at 45° C.).

Figure 8A:
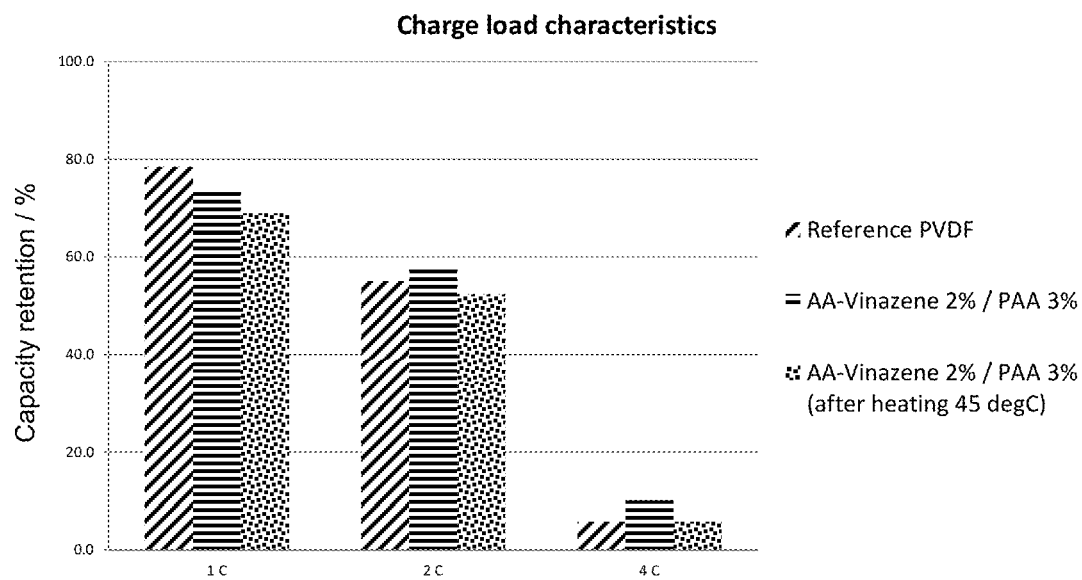
FIGS. 8A and 8B display a graph of the charge in FIG. 8A and discharge in FIG. 8B load characteristics of LFP/LTO cells. The capacity retention was evaluated at different charge and discharge rates (1 C, 2 C and 4 C) and recorded at a temperature of −15° C. The results are presented for the reference Cell 1 (see table 3), for Cell 3 (see table 3) and for Cell 3 after heating it at 45° C.
Figure 8B:
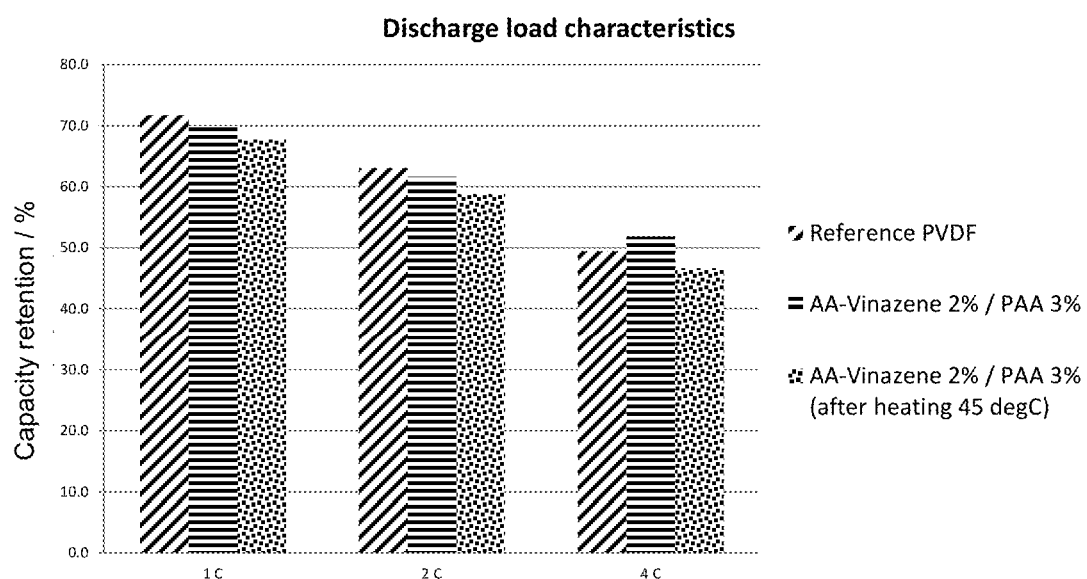

FIGS. 8A and 8B showcase the influence of the 2-vinyl-4,5-dicyanoimidazole on capacity retention when the cell is charged (a) and discharged (b) at a low temperature of −15° C. for LFP/LTO coin cells (Cell 1 compared to Cell 3 and Cell 3 after heating at 45° C.). Although, not as significant as in FIGS. 6A, 6B, and 7, a difference on the capacity retention at high rate of charge and discharge (4 C) can also be observed at low temperature.

Figure 9A:
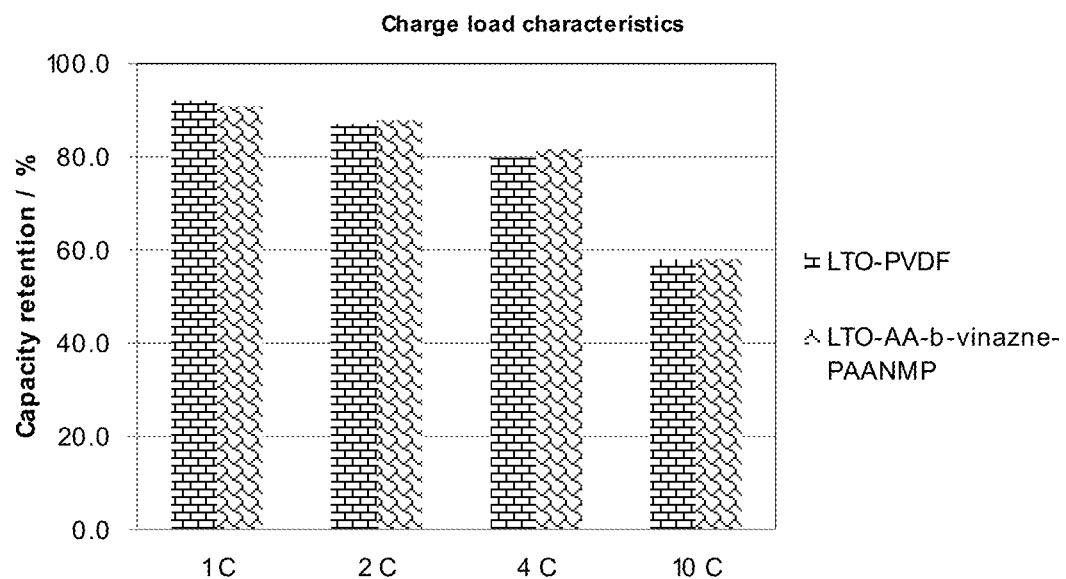
FIGS. 9A and 9B display a graph of the charge in FIG. 9A and discharge in FIG. 9B load characteristics of LFP/LTO cells. The capacity retention was evaluated at different charge and discharge rates (1 C, 2 C and 4 C) and recorded at a temperature of 25° C. The results are presented for the reference Cell 1 (see table 3) and for Cell 7 (see table 3).
Figure 9B:
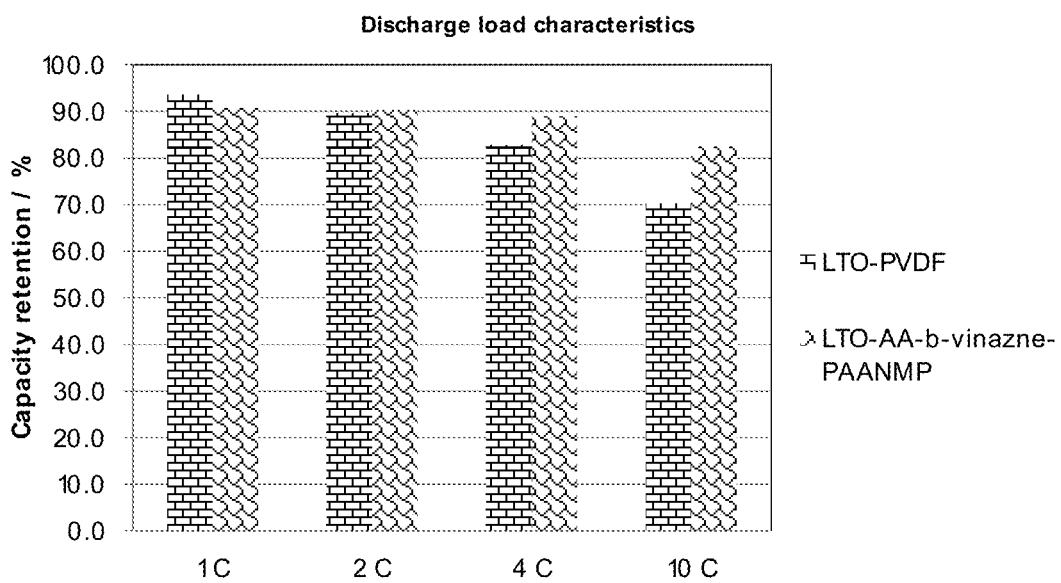

The influence on the capacity retention of the 2-vinyl-4,5-dicyanoimidazole, when used in the anode material, is also very notable at high rate of charge and discharge (4 C and 10 C) as demonstrated in FIGS. 9A and 9B for LFP/LTO coin cells (Cell 1 compared to Cell 7) at 25° C. This is also more significant for discharge.

e) Effect of Temperature on H-Bonding

Figure 10:
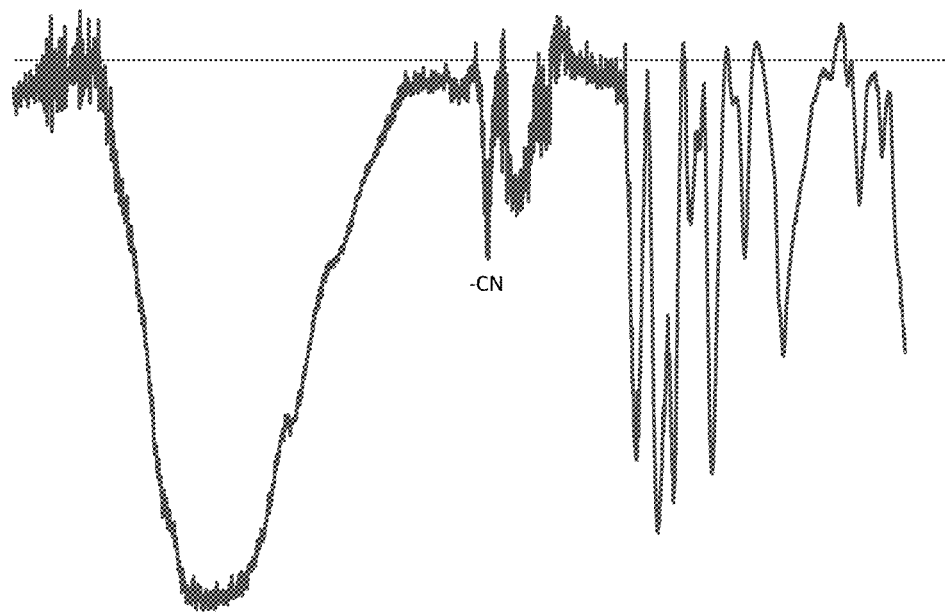
FIG. 10 displays a Fourier transform infrared spectroscopy (FTIR) spectrum of a copolymer of 2-vinyl-4,5-dicyanoimidazole and acrylic acid. The analysis was performed at a temperature of 25° C.

The polymer was stirred at 25° C. for 1 hour with 1 equivalent of lithium salt in solution and then dried. The Fourier transform infrared spectroscopy (FTIR) analysis was performed and the spectrum is presented in FIG. 10.

Figure 11:
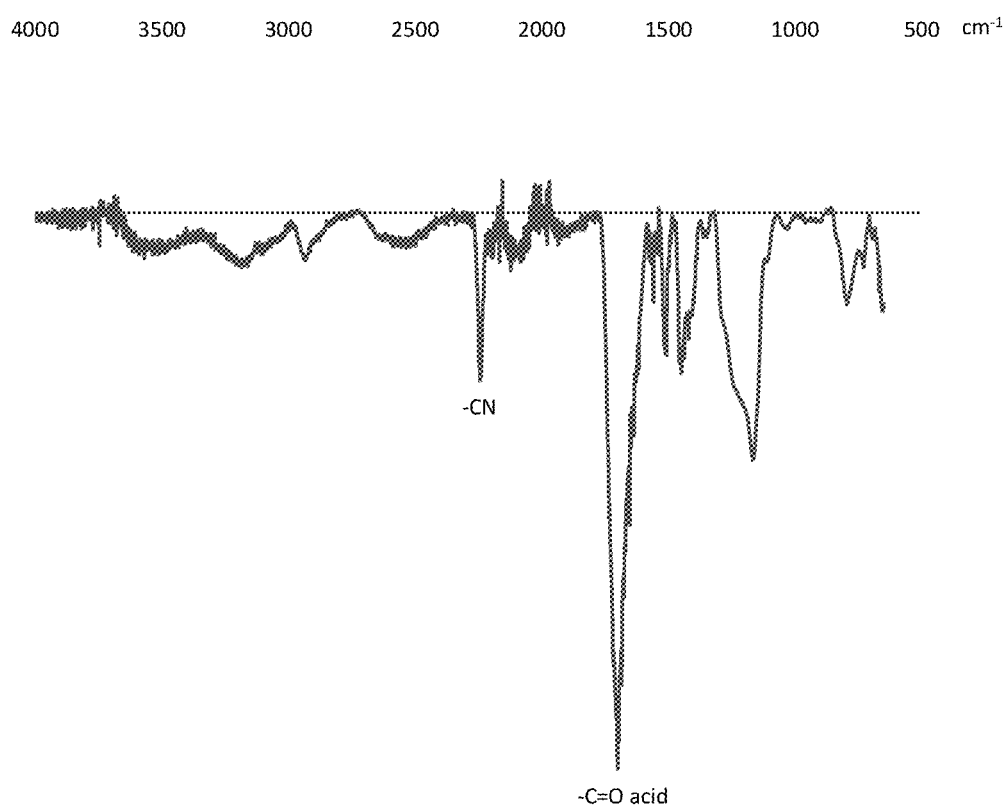
FIG. 11 displays a FTIR spectrum of the copolymer of 2-vinyl-4,5-dicyanoimidazole and acrylic acid. The analysis was performed after heating of the polymer at a temperature of 45° C. (see Example 5(d)).

The polymer was stirred at 45° C. for 1 hour with 1 equivalent of lithium salt in solution and then dried. FTIR analysis was performed and the spectrum is presented in FIG. 11. The spectrum in FIG. 11 is significantly different from the one in FIG. 10. The hydrogen bond peak is significantly attenuated which is indicative of lithium ion coordination. Furthermore, FIG. 11 also displays less N—H bending then FIG. 10.

Numerous modifications could be made to any of the embodiments described above without departing from the scope of the present invention. Any references, patents or scientific literature documents referred to in the present document are incorporated herein by reference in their entirety for all purposes.

The invention claimed is:

1. An element of an electrochemical cell comprising a polymer, wherein said polymer:
   (i) comprises monomeric units derived from Formulae I and II:

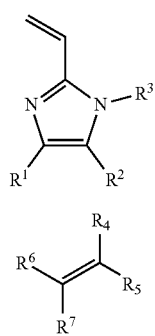

Formula I

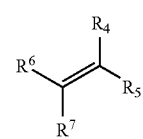

Formula II (ii) is a random or a block copolymer of Formula IV:

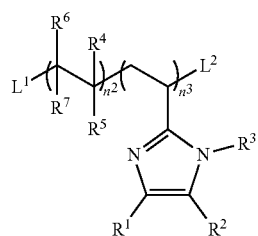

Formula IV (iii) is a random or a block copolymer of Formula V:

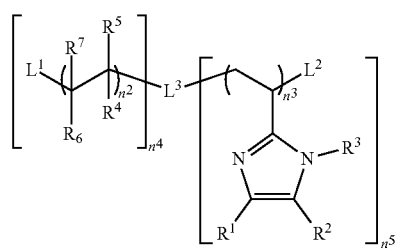

Formula V (iv) comprises monomeric units derived from Formula I:

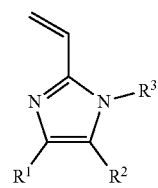

Formula I or
(v) is a homopolymer of Formula III:

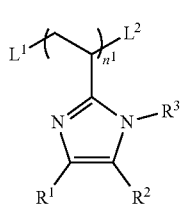

Formula III wherein,
$R^1$ and $R^2$ are each independently selected from H, CN, F, and optionally fluorinated $C_{1-6}$ alkyl groups, wherein at least one $R^1$ and $R^2$ is CN;
$R^3$ is a hydrogen atom or an optionally substituted $C_{1-6}$ alkyl group;
$R^4$, $R^6$, and $R^7$ are each independently selected from a hydrogen atom and optionally substituted $C_{1-6}$alkyl groups; and
$R^5$ is selected from —$CO_2H$, optionally substituted —$CO_2C_{1-6}$alkyl groups, —$C(O)NH_2$, optionally substituted —$OC_{1-6}$alkyl groups, optionally substituted $C_6$aryl groups, optionally substituted $C_{5-6}$heteroaryl groups, —CN, —$SO_3H$, —$SO_2NH_2$, and optionally substituted —$SO_3C_{1-6}$alkyl groups;
or
$R^5$ taken together with $R^7$ and their adjacent carbon atoms form a 5 or 6-membered heterocycle;
$L^1$ and $L^2$ are independently selected from H, an alkyl group, a residue of a polymerisation initiator, and a linker between two or more of the polymer chains;
$L^3$ is selected from linear or branched alkyl groups and linkers between polymer chains;
$n^1$ is an integer selected such that the average molecular weight is from about 2,000 to about 50,000 g/mol;
$n^2$ and $n^3$ are integers representing the number of each monomeric unit within the polymer and wherein, in Formula IV, $n^2$ and $n^3$ are selected such that the average molecular weight is from about 2,000 to about 50,000 g/mol; and the ratio $n^2:n^3$ range from 9:1 to 1:1; and
$n^4$ and $n^5$ are each selected from 1 to 4, wherein, in Formula V, $n^2$, $n^3$, $n^4$ and $n^5$ are selected such that the number average molecular weight is from about 2 000 to about 50 000 g/mol, or from about 3 000 to about 10 000 g/mol, and the ratio $(n^2 \times n^4):(n^3 \times n^5)$ range from 9:1 to 1:1;
or a salt thereof.

2. The element of claim 1, wherein $R^1$ is CN and $R^2$ is an optionally fluorinated $C_{1-6}$alkyl group, or $R^2$ is CN and $R^1$ is an optionally fluorinated $C_{1-6}$alkyl group, or both $R^1$ and $R^2$ are CN.

3. The element of claim 1, wherein $R^3$ is H.

4. The element of claim 1, wherein $R^3$ is an optionally substituted $C_{1-6}$ alkyl group.

5. The element of claim 1, wherein at least one of $R^4$, $R^6$, and $R^7$ is H.

6. The element of claim 1, wherein $R^4$ is an optionally substituted $C_{1-6}$ alkyl group.

7. The element of claim 1, wherein $R^5$ is $CO_2H$, or an optionally substituted $—CO_2C_{1-6}$alkyl group.

8. The element of claim 1, wherein $R^5$ is an optionally substituted $—OC_{1-6}$alkyl group.

9. The element of claim 1, wherein $R^5$ taken together with $R^7$ and their adjacent carbon atoms form a 5-membered heterocycle.

10. The element of claim 1, wherein the polymer in (i) to (iii) comprises between 10 mol % and 90 mol % or between 10 mol % and 60 mol % or between 15 mol % and 40 mol % of monomeric units derived from a vinylimidazole derivative of Formula I, each upper and lower values being included.

11. The element of claim 1, wherein the polymer is of Formula IV and the ratio $n^2:n^3$ ranges from 4:1 to 3:2, or is of about 7:3.

12. The element of claim 1, wherein the polymer is of Formula V and the ratio $(n^2 \times n^4):(n^3 \times n^5)$ ranges from 4:1 to 3:2, or is of about 7:3, and/or wherein $n^4+n^5=3$ or 4.

13. The element of claim 1, wherein the polymer is of Formula V and $L^3$ is selected from branched alkyl groups and functionalized branched alkyl groups.

14. The element of claim 1, wherein said polymer is as defined in (i) to (iii) and is a random copolymer.

15. The element of claim 1, wherein said polymer is as defined in (i) to (iii) and is a block copolymer.

16. The element of claim 1, wherein said polymer is as defined in (i) to (iii) and is a branched or hyperbranched copolymer including comb and dendritic, or is a star copolymer wherein linear chains of said star copolymer are homogeneous or heterogenous in length and structure.

17. The element of claim 1, wherein said linkers $L^1$ and $L^2$ are selected from a group consisting of linear or branched alkyl, alkoxyl, and aryl groups, each of which may be further substituted.

18. The element of claim 1, wherein said linkers $L^1$ and $L^2$ groups optionally comprise two or more functional groups comprising heteroatoms selected from oxygen, nitrogen and sulfur.

19. The element of claim 1, wherein the said salts of the polymers are selected from alkali, and alkaline earth metal salts.

20. The element of claim 1, wherein said element is an electrode material, an electrolyte composition and/or a separator.

21. An electrode material, the electrode material being an element as defined in claim 1 comprising the polymer and an electrochemically active material.

22. The electrode material of claim 21, wherein said polymer is a binder.

23. The electrode material of claim 22, wherein said binder further comprises a second polymer selected from polymers based on glycidyl, acrylic or methacrylic acid, vinyl alkyl ether, thiol-containing monomers, fluorine containing polymers, water soluble binders, styrene butadiene rubber, butadiene acrylonitrile rubber, hydrogenated butadiene acrylonitrile rubber, epichlorohydrin rubber, acrylate rubber, cellulose-based binders, ion-conductive polymer binders and any combination of two or more of these.

24. The electrode material of claim 21, wherein said electrode material comprises particles having a core-shell structure, wherein the shell comprises a shell composition comprising the polymer and the core comprises the electrochemically active material.

25. An electrolyte, the electrolyte being an element as defined in claim 1 comprising the polymer and optionally a lithium salt, wherein said electrolyte is a solid polymer electrolyte (SPE) or a gel electrolyte composition.

26. The electrolyte of claim 25, wherein the electrolyte composition further comprises a second polymer.

27. An electrolyte comprising a separator and an electrolyte composition, wherein said separator is an element as defined in claim 1, and the electrolyte optionally further comprises a lithium salt.

28. An electrochemical cell comprising a negative electrode, a positive electrode and an electrolyte, wherein at least one of the negative electrode, positive electrode and electrolyte comprises an element as defined in claim 1.

29. An electrochemical cell comprising a negative electrode, a positive electrode and an electrolyte, wherein at least one of the negative electrode and positive electrode comprises an electrode material as defined in claim 21.

30. An electrochemical cell comprising a negative electrode, a positive electrode and an electrolyte, wherein the electrolyte is as defined in claim 25.

31. An electrochemical cell comprising a negative electrode, a positive electrode and an electrolyte, wherein the electrolyte is as defined in claim 27.

32. The electrode material of claim 22, wherein said polymer binder is present at a concentration of up to 10 wt % in the total weight of the electrode material.

33. The electrode material of claim 23, wherein said second polymer is selected from poly(acrylic acid), polyvinylidene fluoride, carboxymethylcellulose, styrene butadiene rubber, and a block copolymer composed of at least one lithium-ion solvating segment and at least one cross-linkable segment.

34. The electrode material of claim 24, wherein the shell composition comprises said polymer at a concentration of between 5 wt % and 100 wt %.

35. The electrolyte of claim 25, wherein the concentration of the polymer within the electrolyte composition is at most 50 wt %.

36. The electrolyte of claim 26, wherein the second polymer is selected from the group consisting of a PEO-based polymer, polyvinylidene fluoride, carboxymethylcellulose, polyvinyl acetate and a polyethyleneglycol-based polymer.

* * * * *